US010222963B2

(12) United States Patent
Jung et al.

(10) Patent No.: US 10,222,963 B2
(45) Date of Patent: Mar. 5, 2019

(54) DISPLAY APPARATUS AND CONTROL METHOD CAPABLE OF PERFORMING AN INITIAL SETTING

(71) Applicant: SAMSUNG ELECTRONICS CO., LTD., Suwon-si (KR)

(72) Inventors: Yeon-hee Jung, Seoul (KR); Do-hyoung Kim, Seoul (KR); Se-jun Park, Seoul (KR); Yoon-woo Jun, Seoul (KR); Joo-yeon Cho, Seoul (KR); Sun Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 449 days.

(21) Appl. No.: 14/260,709

(22) Filed: Apr. 24, 2014

(65) Prior Publication Data

US 2014/0325360 A1 Oct. 30, 2014

(30) Foreign Application Priority Data

Apr. 24, 2013 (KR) ........................ 10-2013-0045783
Mar. 26, 2014 (KR) ........................ 10-2014-0035486

(51) Int. Cl.
*G06F 3/048* (2013.01)
*G06F 3/0484* (2013.01)
*G06F 9/451* (2018.01)
*G06F 3/0488* (2013.01)
*G06F 3/0482* (2013.01)
*G06F 3/16* (2006.01)
*G09B 21/00* (2006.01)

(52) U.S. Cl.
CPC ........ *G06F 3/04847* (2013.01); *G06F 3/0482* (2013.01); *G06F 3/0488* (2013.01); *G06F 3/04883* (2013.01); *G06F 3/167* (2013.01); *G06F 9/451* (2018.02); *G09B 21/00* (2013.01)

(58) Field of Classification Search
None
See application file for complete search history.

(56) References Cited

U.S. PATENT DOCUMENTS

| 9,578,154 | B2* | 2/2017 | Ahonen | ................ | G06F 1/1626 |
| 2003/0013073 | A1* | 1/2003 | Duncan | .................... | G09B 5/02 |
| | | | | | 434/317 |
| 2006/0068851 | A1* | 3/2006 | Ashman, Jr. | .......... | G06F 1/1626 |
| | | | | | 455/566 |

(Continued)

FOREIGN PATENT DOCUMENTS

| EP | 1862902 A2 | 12/2007 |
| EP | 2362186 A1 | 8/2011 |
| JP | 2004-178091 A | 6/2004 |

OTHER PUBLICATIONS

Communication dated Oct. 30, 2014, issued by the European Patent Office in counterpart European Application No. 14165666.0.

(Continued)

*Primary Examiner* — Hua Lu
(74) *Attorney, Agent, or Firm* — Sughrue Mion, PLLC

(57) ABSTRACT

A display apparatus which is capable of performing an initial setting and a controlling control method thereof are provided. The display apparatus includes an output unit configured to output a user interface (UI) which is controllable by a plurality of input modes, and a controller configured to set an input mode according to a user feedback type regarding the UI, and configured to output another UI which corresponds to the set input mode.

17 Claims, 57 Drawing Sheets

(56) References Cited

U.S. PATENT DOCUMENTS

| | | | |
|---|---|---|---|
| 2009/0040175 A1* | 2/2009 | Xu | G06F 3/0346 345/156 |
| 2009/0179768 A1* | 7/2009 | Sander | H04M 1/05 340/13.27 |
| 2009/0182562 A1* | 7/2009 | Caire | G01C 21/3608 704/275 |
| 2009/0229892 A1* | 9/2009 | Fisher | G06F 1/1626 178/18.03 |
| 2009/0231145 A1* | 9/2009 | Wada | A61B 5/02416 340/575 |
| 2010/0225602 A1* | 9/2010 | Fujimura | G06F 3/038 345/173 |
| 2010/0309140 A1* | 12/2010 | Widgor | G06F 3/04883 345/173 |
| 2011/0288850 A1* | 11/2011 | Shen | G06F 3/038 704/2 |
| 2012/0050180 A1* | 3/2012 | King | G06F 3/0416 345/173 |
| 2012/0139856 A1* | 6/2012 | Ise | G06F 3/04845 345/173 |
| 2012/0299862 A1* | 11/2012 | Matsumoto | G06F 3/0488 345/173 |
| 2012/0311508 A1* | 12/2012 | Fleizach | G06F 3/0488 715/863 |
| 2013/0159872 A1* | 6/2013 | Son | G06F 9/44505 715/744 |
| 2014/0125606 A1* | 5/2014 | Namkung | G06F 1/1656 345/173 |
| 2014/0189593 A1* | 7/2014 | Kurita | G06F 3/0488 715/835 |
| 2014/0191977 A1* | 7/2014 | Feng | G06F 3/018 345/173 |
| 2015/0220151 A1* | 8/2015 | Violet | G06F 3/0483 715/777 |

OTHER PUBLICATIONS

Communication dated Feb. 8, 2017, issued by the European Patent Office in counterpart European Application No. 14165666.0.
Communication dated Nov. 21, 2018, issued by the European Patent Office in counterpart European Application No. 14165666.0.

* cited by examiner

100

DISPLAY APPARATUS AND CONTROL METHOD CAPABLE OF PERFORMING AN INITIAL SETTING

CROSS-REFERENCE TO RELATED APPLICATIONS

This application claims priority from Korean Patent Application No. 1020130045783, filed in the Korean Intellectual Property Office on Apr. 24, 2013, and Korean Patent Application No. 1020140035486, filed in the Korean Intellectual Property Office on Mar. 26, 2014, the disclosures of which are incorporated herein by reference, in their entirety.

BACKGROUND

1. Field

Apparatuses and methods consistent with exemplary embodiments relate to a display apparatus and a controlling method thereof. More particularly, the exemplary embodiments relate to a display apparatus which is capable of performing an initial setting and a control method thereof.

2. Description of the Related Art

With the development of electronic technology, users may utilize various types of display apparatuses such as a smart phone, a tablet, a television, and so on.

When a user purchases such a display apparatus and tries to use it for the first time, the user may perform an initial setting for the display apparatus, and when the initial setting is completed, the user may use the functions of the display apparatus appropriately.

In this case, in response to the users not being good at using the display apparatus or have some disabilities, it may be difficult for users to perform the initial setting by only using an initial setting method provided by the display apparatuses of the related art.

Accordingly, a method of allowing users to perform the initial setting of a display apparatus with ease is desired.

SUMMARY

One or more exemplary embodiments provide a display apparatus which allows users to perform the initial setting of the display apparatus with ease, and a control method thereof.

According to an aspect of an exemplary embodiment, there is provided a display apparatus including an output unit configured to output a user interface (UI) which is controllable by a plurality of input modes and a controller configured to set an input mode according to a type of user feedback regarding the UI, and control the output unit to output a UI which corresponds to the set input mode.

The UI controllable by a plurality of input modes may include a graphic UI and a voice UI for initial setting of the display apparatus, and the controller, in response to a touch manipulation regarding the graphic UI being input, may set a touch mode as an input mode to be applied to initial setting, and when a user voice regarding the voice UI is input, set a voice mode as an input mode to be applied to the initial setting.

The controller, in response to a touch mode or a voice mode being input as the input mode based on the user feedback, may output a UI to reset the set input mode as one of a touch mode, a drawing mode, and a voice mode, and perform initial setting for the display apparatus based on an input mode which is reset through the UI.

The controller, in response to a touch mode being reset as the input mode, may recognize a touch input regarding a setting item displayed on a screen and perform initial setting for the display apparatus.

The controller, in response to a drawing mode being reset as the input mode, may recognize a drawing trace input on a screen and perform initial setting for the display apparatus according to a setting item corresponding to the recognized drawing trace.

The controller, in response to a voice mode being reset as the input mode, may perform initial setting for the display apparatus according to a setting item corresponding to a user voice which is input.

The apparatus may further include a communicator configured to perform communication with an external apparatus, and the controller, in response to initial setting of the display apparatus being completed, may transmit information regarding completed initial setting to the external apparatus.

The external apparatus may include at least one of another display apparatus, an external server and a near-field wireless communication tag.

In addition, when an item for setting an environment of the display apparatus is selected, the controller may provide a plurality of menus classified according to an attribute of a setting function, and when a menu is selected from among the plurality of menus, may provide a sub-menu which belongs to the selected menu.

According to an aspect of another exemplary embodiment, there is provided a method of controlling a display apparatus, the method including outputting a UI which is controllable by a plurality of input modes and setting an input mode according to a type of a user feedback regarding the UI, and outputting another UI which corresponds to the set input mode.

The UI controllable by a plurality of input modes may include a graphic UI and a voice UI for initial setting of the display apparatus, and the outputting a UI corresponding to the set input mode may include, in response to a touch manipulation regarding the graphic UI being input, setting a touch mode as an input mode to be applied to initial setting, and in response to a user voice regarding the voice UI being input, setting a voice mode as an input mode to be applied to the initial setting.

The method may further include outputting a UI to reset the set input mode as one of a touch mode, a drawing mode, and a voice mode, and performing initial setting for the display apparatus based on an input mode which is reset through the UI.

The performing initial setting may include, in response to a touch mode being reset as the input mode, recognizing a touch input regarding a setting item displayed on a screen and performing initial setting for the display apparatus.

The performing initial setting may include, in response to a drawing mode being reset as the input mode, recognizing a drawing trace input on a screen and performing initial setting for the display apparatus according to a setting item corresponding to the recognized drawing trace.

The performing initial setting may include, in response to a voice mode being reset as the input mode, performing initial setting for the display apparatus according to a setting item corresponding to a user voice which is input.

The method may further include, in response to initial setting of the display apparatus being completed, transmitting information regarding completed initial setting to the external apparatus.

The external apparatus may include at least one of another display apparatus, an external server and a near-field wireless communication tag.

In addition, when an item for setting the environment of the display apparatus is selected, the control method according to the present exemplary embodiment may further include providing a plurality of category menus classified according to the attribute of the setting function and, when a menu is selected from among the plurality of category menus, providing a sub-menu which belongs to the selected category menu.

BRIEF DESCRIPTION OF THE DRAWINGS

The above and/or other aspects will be more apparent by describing certain exemplary embodiments with reference to the accompanying drawings, in which.

DETAILED DESCRIPTION

It should be observed that the method steps and system components have been represented by symbols of the related arts in the figures, showing only specific details which are relevant for an understanding of the exemplary embodiments. Further, details that may be readily apparent to a person ordinarily skilled in the art may not have been disclosed. In the exemplary embodiments, relational terms such as first and second, and the like, may be used to distinguish one entity from another entity, without necessarily implying any actual relationship or order between such entities.

Figure 1:
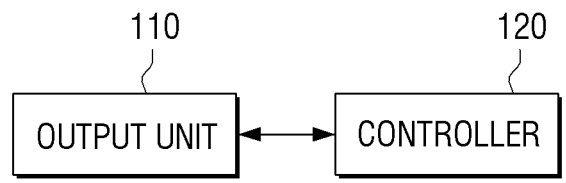
FIG. 1 is a block diagram provided to explain configuration of a display apparatus according to an exemplary embodiment.

FIG. 1 is a block diagram provided to explain a configuration of a display apparatus according to an exemplary embodiment. The display apparatus 100 may determine the type of disability that a user has, and may perform an initial setting of the display apparatus 100 differently, according to the type of disability that has been determined. The display apparatus 100 which performs such a function may be implemented as various types of electronic apparatuses such as a smart phone, a tablet, a television, a desktop personal computer (PC), a notebook PC, and so on.

Referring to FIG. 1, the display apparatus 100 includes an output unit 110 and a controller 120.

The output unit 110 outputs a user interface which is controllable by a plurality of input modes (or interaction modes). Herein, the UI controllable by a plurality of input modes may include a graphic UI (or a UI screen) and a voice UI for performing an initial setting of the display apparatus 100. The output unit 110 may be implemented by a display, such as a liquid crystal display (LCD), an organic light emitting diode (OLED) display, etc., and/or a speaker, an audio output port, etc.

The controller 120 controls overall operations of the display apparatus 100. The controller 120 may include a Random Access Memory (RAM) and Read Only Memory (ROM) to operate the display apparatus 100. In this case, these modules may be implemented in the form of System on Chip (SoC).

In response to the occurrence of a predetermined event, the controller 120 may perform an initial setting of the display apparatus 100 by executing a pre-stored program in the display apparatus 100. Herein, the predetermined event may include an event to turn on the display apparatus 100 for the first time after it is manufactured, an event to initialize the display apparatus 100, and an event to turn on the initialized display apparatus 100.

In addition, the controller 120 may set setting values (or an initial setting value) of the display apparatus 100 based on the setting values which are input at the time of the initial setting. For example, the controller 120 may receive setting values for each setting menu such as language, to be applied, WiFi network, date/time, user account, and so on, and may set the setting values of the display apparatus 100 according to the input setting values.

At the time of initial setting, the controller 120 may determine the type of disability that a user has, and may control the performance of the initial setting differently according to the type of disability that has been determined.

To do so, the controller 120 may control the output unit 110 to output a UI which is controllable by a plurality of input modes with respect to menus which are set at the time of initial setting (hereinafter, basic setting menus). Herein, the input modes include a touch mode and a voice mode.

Specifically, the touch mode refers to a mode where setting values for each setting menu (or selection for each setting menu) are received through a touch manipulation, and the voice mode refers to a mode where setting values for each setting menu (or selection for each setting menu) are received through a voice. Accordingly, the UI controllable by a plurality of input modes may include a graphic UI for receiving setting values for basic setting menus through a touch manipulation, and a voice UI for receiving setting values for basic setting menus through a voice.

Specifically, the graphic UI is a UI screen which receives setting values for basic setting menus through a touch manipulation, and may include setting items for basic setting menus. Accordingly, a user may input setting values for basic setting menus through a touch manipulation of setting items included in the graphic UI.

The voice UI is a voice for receiving setting values for basic setting menus through a user voice, and setting items for basic setting menus may be output as a voice. Accordingly, a user may input setting values for basic setting menus by uttering setting items included in the voice UI.

For example, the basic setting menu may be a menu regarding setting a language to be applied to the display apparatus 100. In this case, the controller 120 may output a setting menu for setting a language as a graphic UI and a voice UI. Subsequently, in response to a touch manipulation being input on the graphic UI, the controller 120 may set a language selected according to the input touch manipulation as a language to be applied to the display apparatus 100, and a language selected according to the input voice on the voice UI as a language to be applied to the display apparatus 100.

Accordingly, in response to basic setting menus being set, the controller 120 may activate both a touch sensor (not shown) to receive a touch manipulation and a microphone (not shown) to receive a voice.

The controller 120 may set an input mode of a subsequent UI according to a user feedback type regarding the UI controllable by a plurality of input modes, and control the output unit 110 to output a UI which corresponds to the set input mode. Specifically, in response to a touch manipulation regarding a graphic UI being input, the controller 120 may set a touch mode as an input mode which is applied for an initial setting, and in response to a voice regarding a voice UI being input, the controller 120 may set a voice mode as an input mode for an initial setting.

In addition, in response to a touch mode or a voice mode being input as an input mode based on user feedback, the controller 120 may output a UI (or a UI screen) to reset the input mode as one of a touch mode, a drawing mode, and a voice mode, and may perform an initial setting of the display apparatus 100 based on the input mode which is reset through the UI.

The drawing mode refers to a mode where setting values for each setting menu (or selection of each setting menu) are input through a touch manipulation. The drawing mode is different from the touch mode in that the touch mode is a mode where setting values are input through a touch manipulation to select or move setting items, whereas the drawing mode is a mode where setting values are input through a touch manipulation to draw a gesture such as text, number, symbol, and so on.

Accordingly, in response to the touch mode being reset (or set) as the input mode, the controller 120 may recognize a touch manipulation regarding a setting item displayed on the screen and may perform initial setting of the display apparatus 100. That is, the controller 120 may display a UI including setting items to receive setting values for each setting menu in the touch mode, and may set setting values of the display apparatus 100 for each setting menu based on the setting items selected in accordance with a touch manipulation input on the UI.

Herein, the controller 120 may inactivate a microphone which receives a user voice, and recognize only a touch manipulation to select or move a setting item from among touch manipulations detected by the touch sensor in order to set setting values of the display apparatus 100 for each setting menu.

In response to the drawing mode being reset (or set) as the input mode, the controller 120 may recognize a drawing trace input on the screen and perform initial setting of the display apparatus 100 according to the recognized drawing trace. That is, the controller 120 may display a UI including setting items to receive setting values for each setting menu in the drawing mode, and may set setting values of the display apparatus 100 for each setting menu based on the setting items selected in accordance with a gesture input on the UI. In this case, the controller 120 may display different identification symbols for each setting item.

Herein, the controller 120 may inactivate a microphone which receives a user voice, and recognize only a gesture of drawing an identification symbol displayed on a setting item from among touch manipulations detected by the touch sensor in order to set setting values of the display apparatus 100 for each setting menu. For example, the controller 120 may determine whether an input touch manipulation is a gesture of drawing an identification symbol which corresponds to a setting item using coordinates of an area where the touch is detected by the touch sensor. In this case, the controller 120 may display the input drawing trace on the screen.

In addition, in response to the voice mode being reset (or set) as the input mode, the controller 120 may perform an initial setting of the display apparatus 100 according to a setting item which corresponds to the input user voice. That is, the controller 120 may display a UI including setting items in order to receive setting values for each setting menu in the voice mode, and set setting values of the display apparatus 100 for each setting menu based on the setting items selected in accordance with an input voice. In this case, the controller 120 may display different identification symbols for each setting item.

Herein, the controller 120 may inactivate the touch sensor, and recognize only a user voice input through the microphone to set setting values of the display apparatus 100 for each setting men. That is, the controller 120 may determine an identification symbol which is represented by the input user voice, and set setting values of the display apparatus 100 according to a setting item which corresponds to the identification symbol.

Hereinafter, the operation of performing initial setting will be described in greater detail with reference to FIGS. 2 to 12. In FIGS. 2 to 12, it is assumed that the basic setting menu is a menu regarding setting a language, and the display apparatus 100 is implemented as a smart phone.

The controller 120 may output a graphic UI and a voice UI for receiving a setting value regarding a language which is a basic setting menu that is set for the first time during initial setting.

Herein, the graphic UI may be a UI screen where items disposed at predetermined locations are moved to a specific location matching with each language according to a touch manipulation, so that a language to be applied to the display apparatus 100 may be set.

Figure 2:
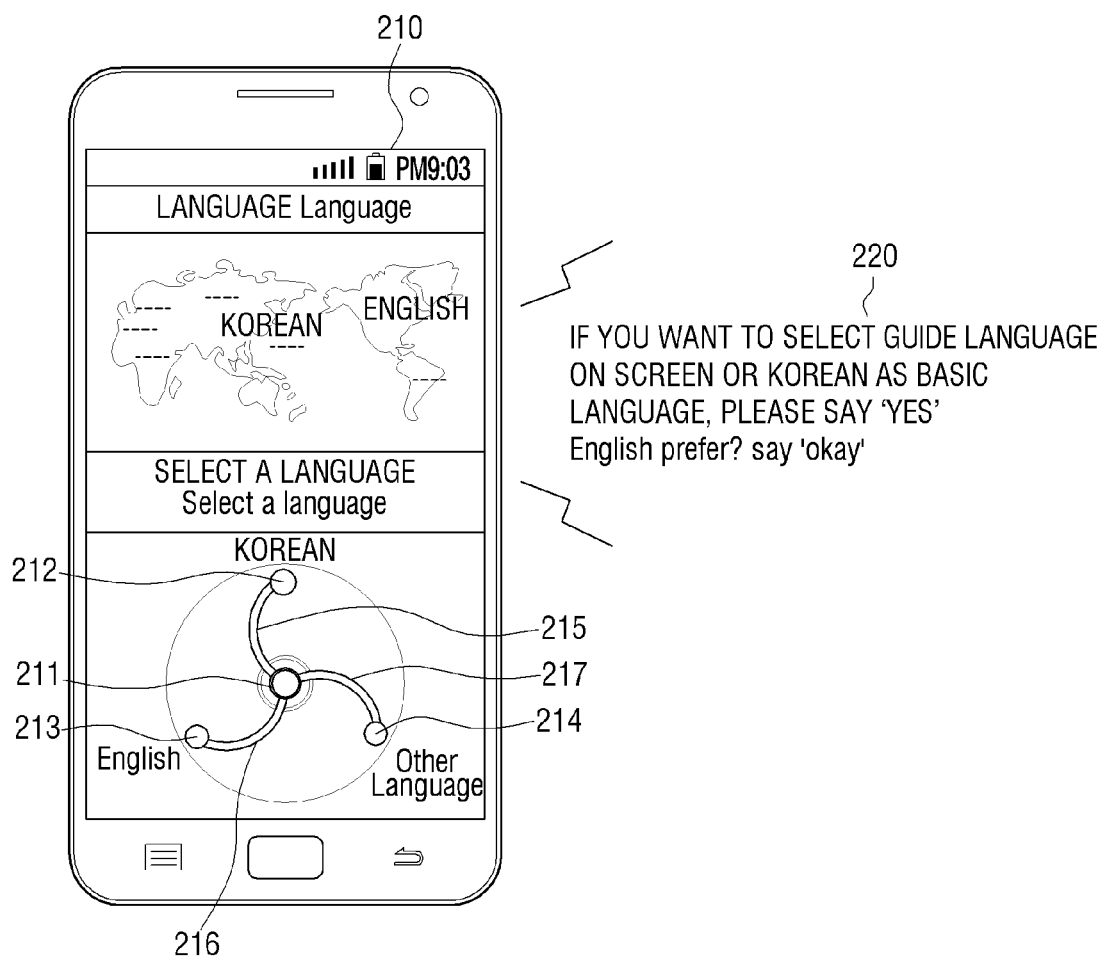
FIGS. 2 to 12C are views provided to explain a method of performing an initial setting based on an input mode according to an exemplary embodiment.

For example, as illustrated in FIG. 2, a selection item 211 may be displayed on one area of the graphic UI 210, and around the selection item 211 menu items 212 to 214 to select a language to be applied to the display apparatus 100 may be displayed around the selection item 211. In addition, the selection item 211 and guidelines 215 to 217 may be displayed on the graphic UI 210 in a curved form which connects each of the menu items 212 to 214.

In addition, a voice UI indicates a method of setting a language to be applied to the display apparatus 100 via a user voice, and may be output as a voice.

For example, as illustrated in FIG. 2, the voice UI 220 may include the contents, "Please set a language following the guideline on the screen, or if you wish to set Korean as a basic language, please say "yes." English prefer? Say 'Okay.'"

In response to a user voice regarding the voice UI not being input for a predetermined period of time, a voice UI which indicates a method to set another language as a language to be applied to the display apparatus 100 may be output.

For example, in response to a user voice not being input for a predetermined period of time, the controller 120 may output a voice UI to receive an input of a language to be applied to the display apparatus 100, except for Korean and English, such as Japanese, Chinese, French, German, Spanish, etc.

In the above exemplary embodiment, the name of each language is displayed in English, but this is only an example. That is, the controller 120 may output the name of each language in the corresponding language.

In addition, in the above exemplary embodiment, in response to a user voice not being input for a predetermined period of time, an additional voice UI may be output, but this is only an example. That is, the controller 120 may also output an additional voice UI when a touch manipulation not being input on the graphic UI for a predetermined period of time.

Further, the controller 120 may set a setting value for basic setting menus based on a user feedback regarding the graphic UI or the voice UI, and set an input mode for the UI which is subsequently provided.

Firstly, in response to a touch manipulation regarding the graphic UI being input, the controller 120 may set a setting value for basic setting menus based on the input touch manipulation, and may set a touch mode as an input mode for the UI which is provided afterward.

For example, in the case of FIG. 2, in response to the selection item 211 being touched and then, a touch manipulation of moving the touched point to one of the menu items 212 to 214 following the guideline 215, 216 or 217 is input, the controller 120 may set a language which is matched with the menu items 212, 213 or 214 where the selection item 211 is moved as a language to be applied to the display apparatus 100. In this case, the controller 120 may move and display the selection item 211 according to the touch manipulation.

For example, when the selection item 211 is moved to the menu item 212 which is matched with Korean following the guideline 215, Korean may be set as an language to be applied to the display apparatus 100.

In addition, when the selection item 211 is moved to the menu item 214 following the guideline 217 according to a touch manipulation, the controller 120 may display a menu for setting another language as a language to be applied to the display apparatus 100. For example, the controller 120 may output a list including the names of other languages except for Korean and English, such as Japanese, Chinese, French, German, Spanish, etc. In response to a language being selected from the list according to a touch manipulation, the controller 120 may set the selected language as a language to be applied to the display apparatus 100.

In response to the selection item 211 being moved to one of the menu items 212 to 214, but is not moved following the guidelines 215, 216 or 217, the controller 120 may not move to the next step and display the UI for setting a language continuously.

As such, in response to a touch manipulation being input to set a basic setting menu, that is, to set a language, the controller may determine that a user may have some disabilities which prevents the user from inputting a certain touch manipulation or a specific pattern, or a voice, and may set a touch mode as an input mode.

In addition, when a user voice regarding the voice UI is input, the controller 120 may set a setting value for a basic setting menu based on the input user voice, and set a voice mode as an input mode for the UI which is input afterward.

For example, as illustrated in FIG. 2, when 'yes' is input in response to the voice UI 220, the controller 120 may set Korean as a language to be applied to the display apparatus 100.

As such, in response to a voice being input to set a basic setting menu, that is, to set a language, the controller 120 may determine that a user is not good at performing a touch manipulation or has some disabilities which prevent the user from performing a touch manipulation, and may set a voice mode as an input mode.

In addition, the controller 120 may compose a UI which is output afterward using a language which is set in accordance with a user feedback. To do so, the display apparatus 100 may pre-store graphic data constituting a UI for each language.

In response to an input mode being set through a basic setting menu, the controller 120 may output a UI to reset the input mode. Herein, the UI may be output in various ways according to the input mode which is set through the basic setting menu.

Specifically, in response to a touch mode being input as an input mode, the controller 120 may output a graphic UI (or a UI screen) including a menu item which is selectable according to a touch manipulation. Herein, the graphic UI may include a menu item to maintain a touch mode which is previously set, or may include a menu item to change an input mode to another mode, such as a voice mode and a drawing mode.

Figure 3A:
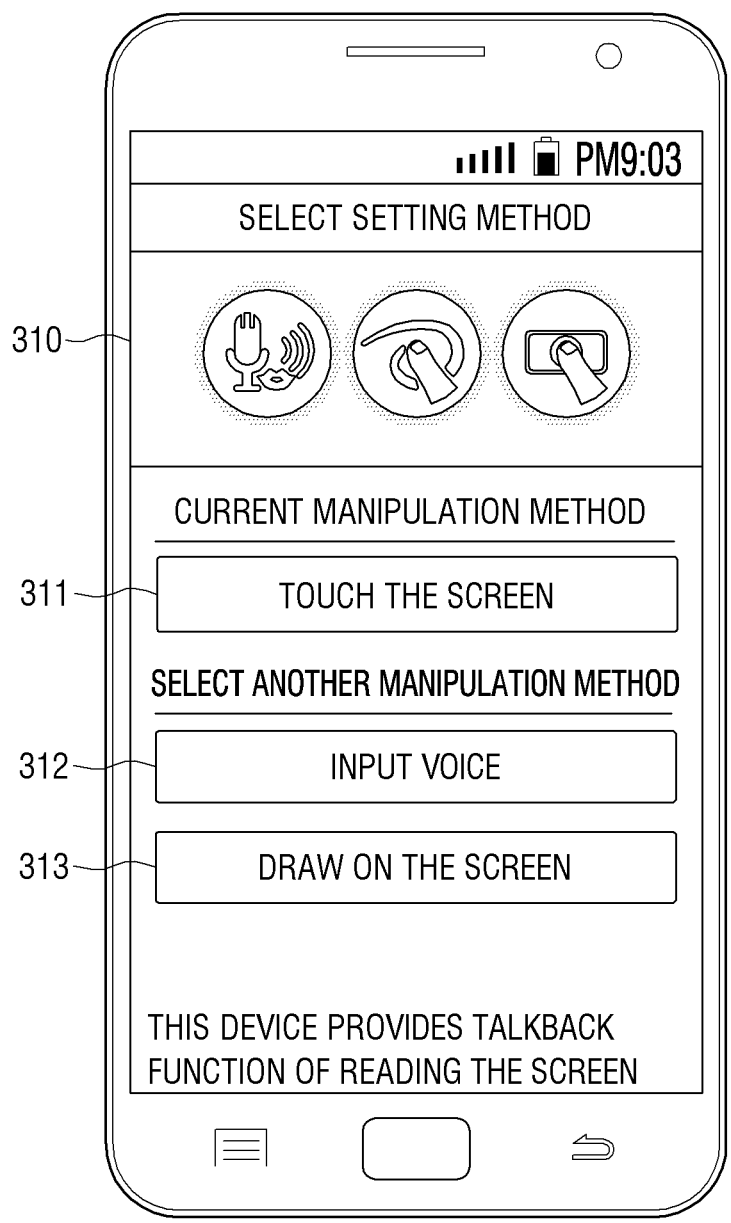

For example, in response to a touch mode being set as an input mode, the controller 120 may output a graphic UI 310 to reset the input mode as illustrated in FIG. 3A.

Referring to FIG. 3A, the graphic UI 310 may include a menu item 311 to maintain a touch mode which is set previously, a menu item 312 to change the previously-set touch mode to a voice mode, and a menu item 313 to change the previously-set touch mode to a drawing mode.

Accordingly, the controller 120 may maintain a previously-set touch mode or change the mode to a new mode based on the menu item selected on the graphic UI, according to a touch manipulation.

For example, in response to a user command to touch the menu item 311 being input in FIG. 3A, the controller 120 may maintain a previously-set touch mode as an input mode. However, in response to a user command to touch the menu item 312 being input, the controller 120 may change the input mode to a voice mode, and in response to a user command to touch the menu item 313 being input, the controller 120 may change the input mode to a drawing mode.

In response to a voice mode being set as an input mode, the controller 120 may output a graphic UI (or a UI screen) indicating a method to maintain the set voice mode or to change the input mode to another mode using a user voice.

Figure 3B:
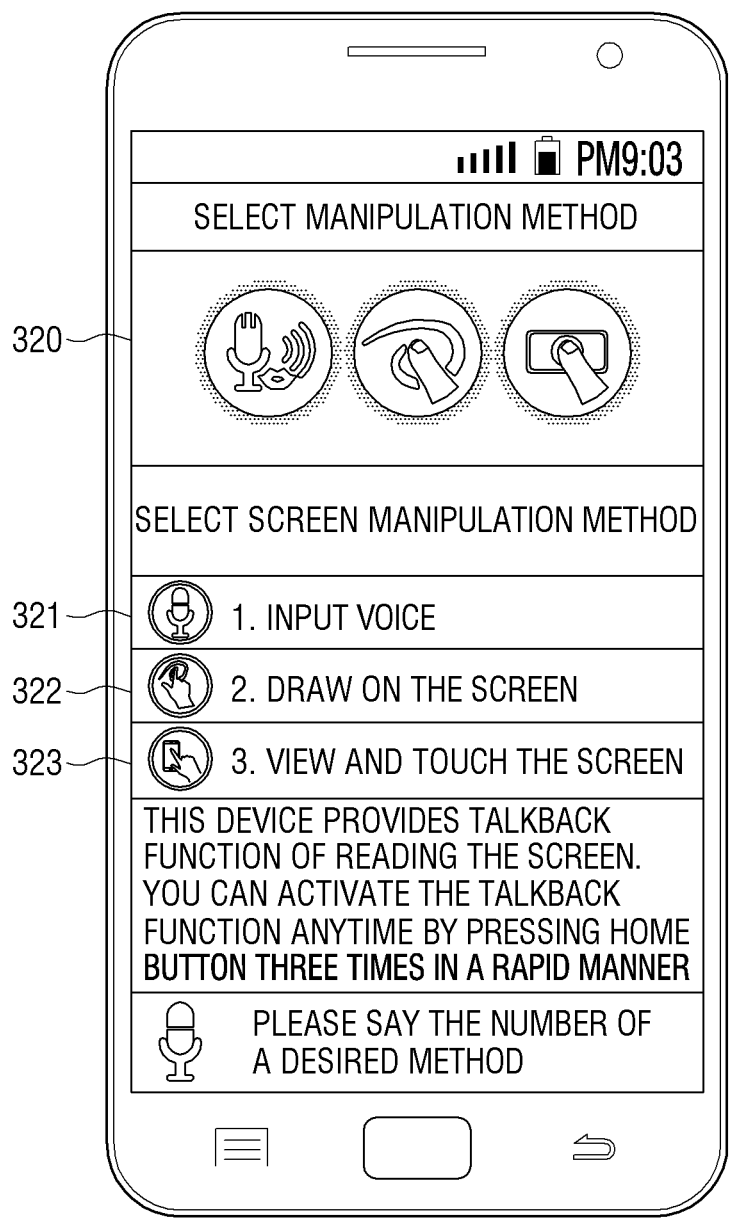

For example, in response to a voice mode being set as an input mode, the controller 120 may output a graphic UI 320 for resetting the input mode, as illustrated in FIG. 3B.

Referring to FIG. 3B, the graphic UI 320 may include information regarding a voice 321 which needs to be uttered to maintain a previously-set voice mode, a voice 322 which needs to be uttered to change a previously-set voice mode to a drawing mode, and a voice 323 which needs to be uttered to change a previously-set voice mode to a touch mode.

Accordingly, the controller 120 may maintain a previously-set voice mode, or set another mode as a new input mode based on a user voice.

For example, in FIG. 3B, when a user voice of one is input, the controller 120 may maintain a previously-set voice mode. However, when a user voice of two is input or a user voice of "three" is input, the controller 120 may respectively change the input mode to a drawing mode or a touch mode.

In the above-described example of voice mode, setting an input mode based on a user voice uttering numbers assigned to each of the voice mode, drawing mode, and the touch mode is only an example. That is, the controller may also maintain a previously-set voice mode, or set another mode as a new input mode based on an input user mode uttering the name of each input mode, such as, a voice mode, a drawing mode and a touch mode.

Subsequently, the controller 120 may perform an initial setting for the display apparatus 100 based on the input mode. That is, the controller 120 may receive setting values for each setting menu differently based on the input mode.

Firstly, in response to a touch mode being set as an input mode, the controller 120 may receive setting values for each setting menu required for initial setting through a user's touch manipulation. Specifically, the controller 120 may display UIs (or UI screens) including a setting item to receive a setting value for each setting menu sequentially, and set a setting value for the display apparatus 100 for each setting menu based on the selected setting item.

Figure 4A:
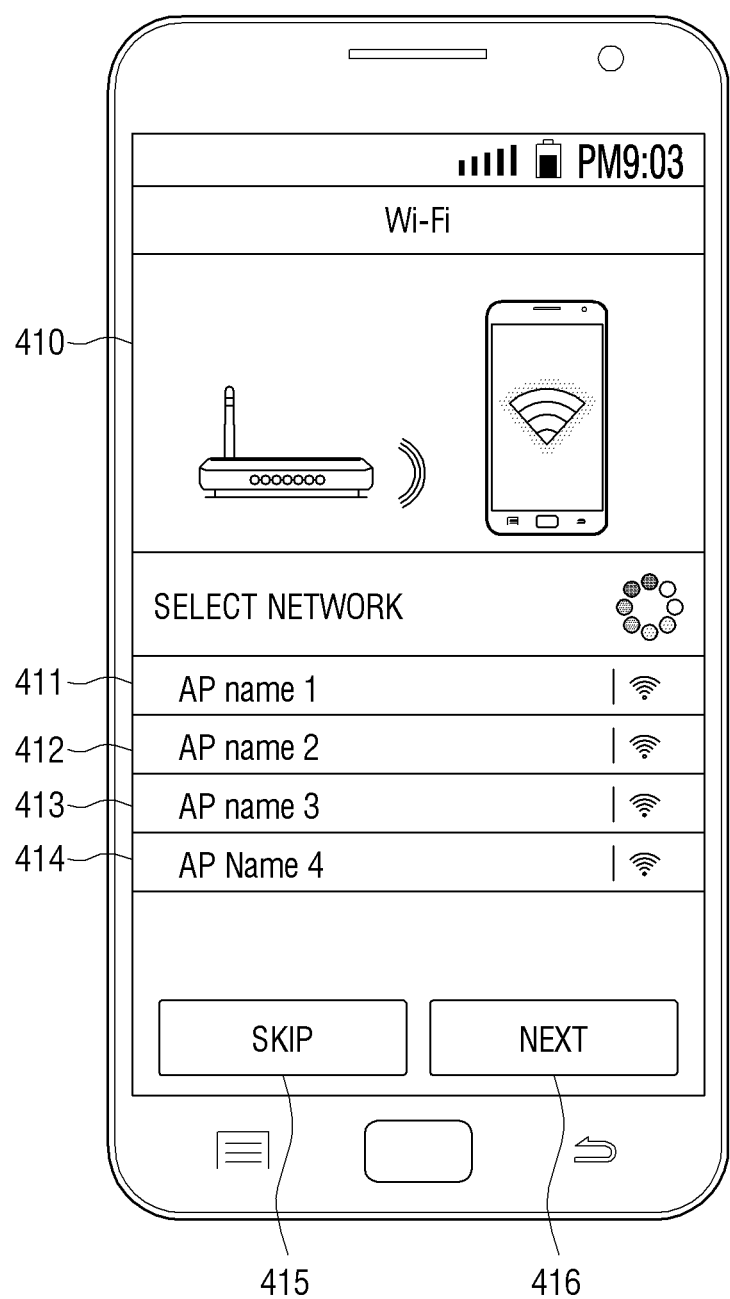

For example, in response to a WiFi network setting being performed after setting a language, the controller 120 may display a UI screen 410 for a WiFi network setting as illustrated in FIG. 4A. Herein, the UI screen 410 may include setting items 411 to 416 to receive a setting value regarding WiFi network through a touch manipulation, and the setting items 411 to 414 may include each access point connectable to WiFi network.

Accordingly, a user may input a setting value for WiFi network by touching a menu item regarding a desired access point for connection. For example, in response to a user touching the setting item 411, and selecting the setting item 416 for the next step, the controller 120 may set access point AP Name 1 as a setting value for WiFi network, and receive a setting value for the setting menu which corresponds to the next step.

In response to a user selecting the setting item 415 to skip the setting for WiFi network, the controller 120 may skip the setting for WiFi network and receive a setting value for the setting menu which corresponds to the next step.

Figure 4B:
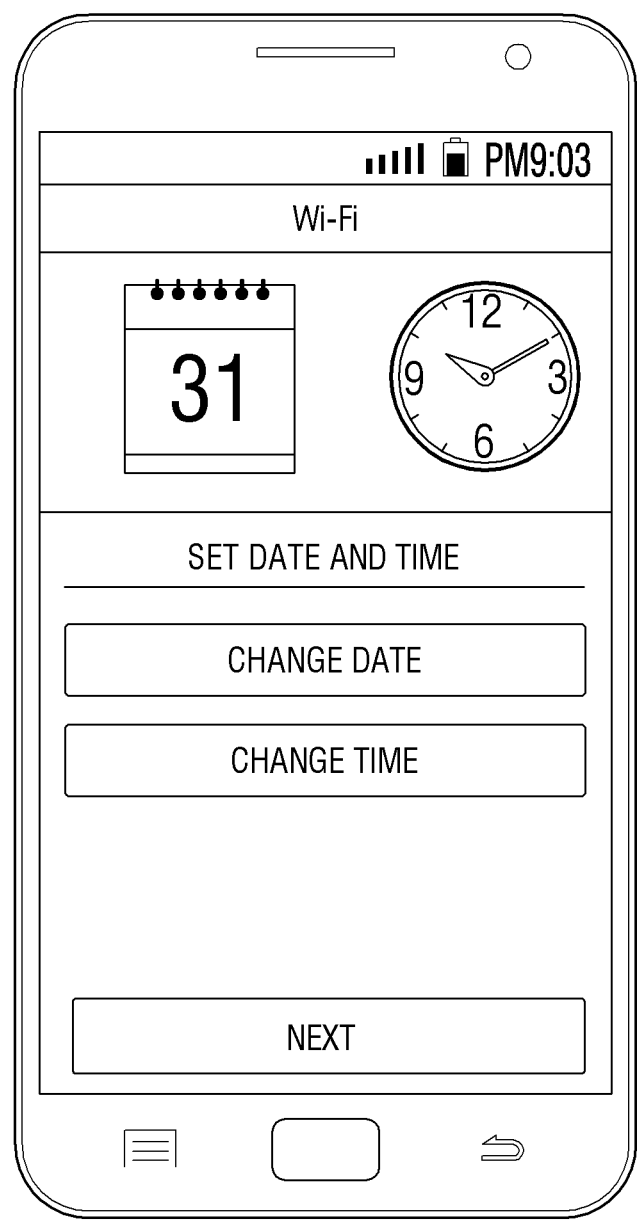
Figure 4C:
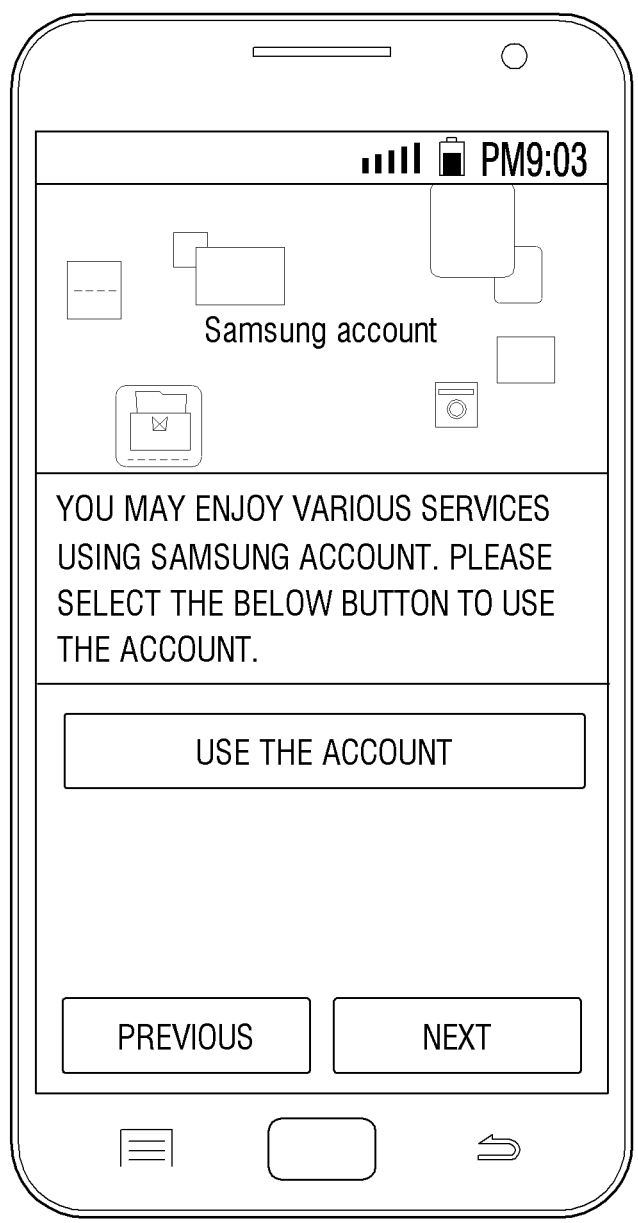

That is, in response to the setting for WiFi network being completed, the controller 120 may perform initial setting by displaying UIs for receiving setting values for other setting menus sequentially, as illustrated in FIGS. 4B and 4C. In FIGS. 4B and 4C, the initial setting is performed according to a touch manipulation of touching setting items displayed on the UI, and thus, a detailed description thereof will not be provided.

In response to a voice mode being set as an input mode, the controller 120 may receive setting values for each setting menu required for the initial setting through a user voice. Specifically, the controller 120 may display UIs (or UI screens) including a setting item to receive a setting value for each setting menu sequentially, and set a setting value for the display apparatus 100 for each setting menu based on the setting item which corresponds to the input voice.

Herein, the UI represents a UI screen including information regarding a user voice which needs to be uttered so as to set setting values which can be set for each setting menu and the corresponding setting values. Accordingly, a user may check setting values included in the UI screen, and may input a setting value for each setting menu by uttering a voice which corresponds to a desired setting value.

Figure 5A:
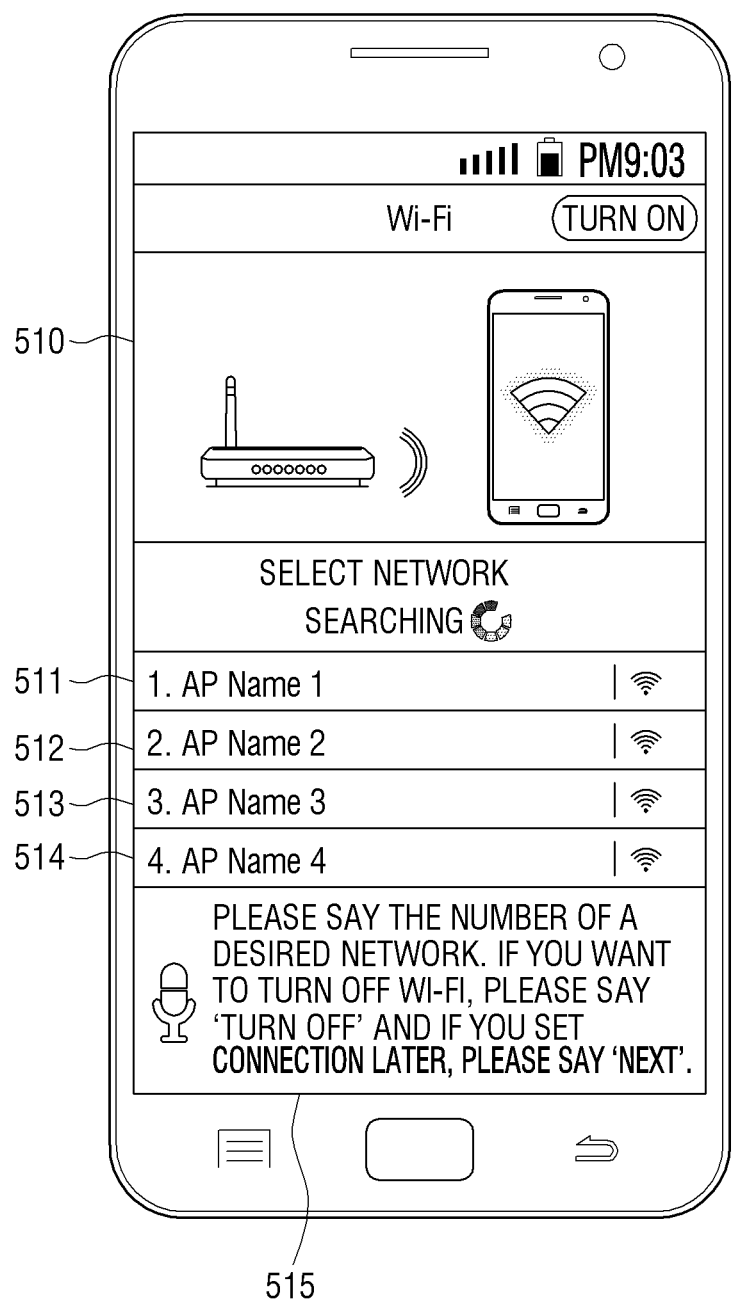

For example, in response to a WiFi network setting being input after a language has been set, the controller 120 may output a UI screen 510 for WiFi network setting as illustrated in FIG. 5A. Herein, the UI screen 510 may include the name of access points which can be set for WiFi network and identification symbols (for example, numbers like 511 to 514) which need to be uttered by the user in order to set the corresponding access points. In addition, the UI screen 510 may include information 515 which needs to be uttered by the user in order to skip the setting for WiFi network.

Figure 5B:
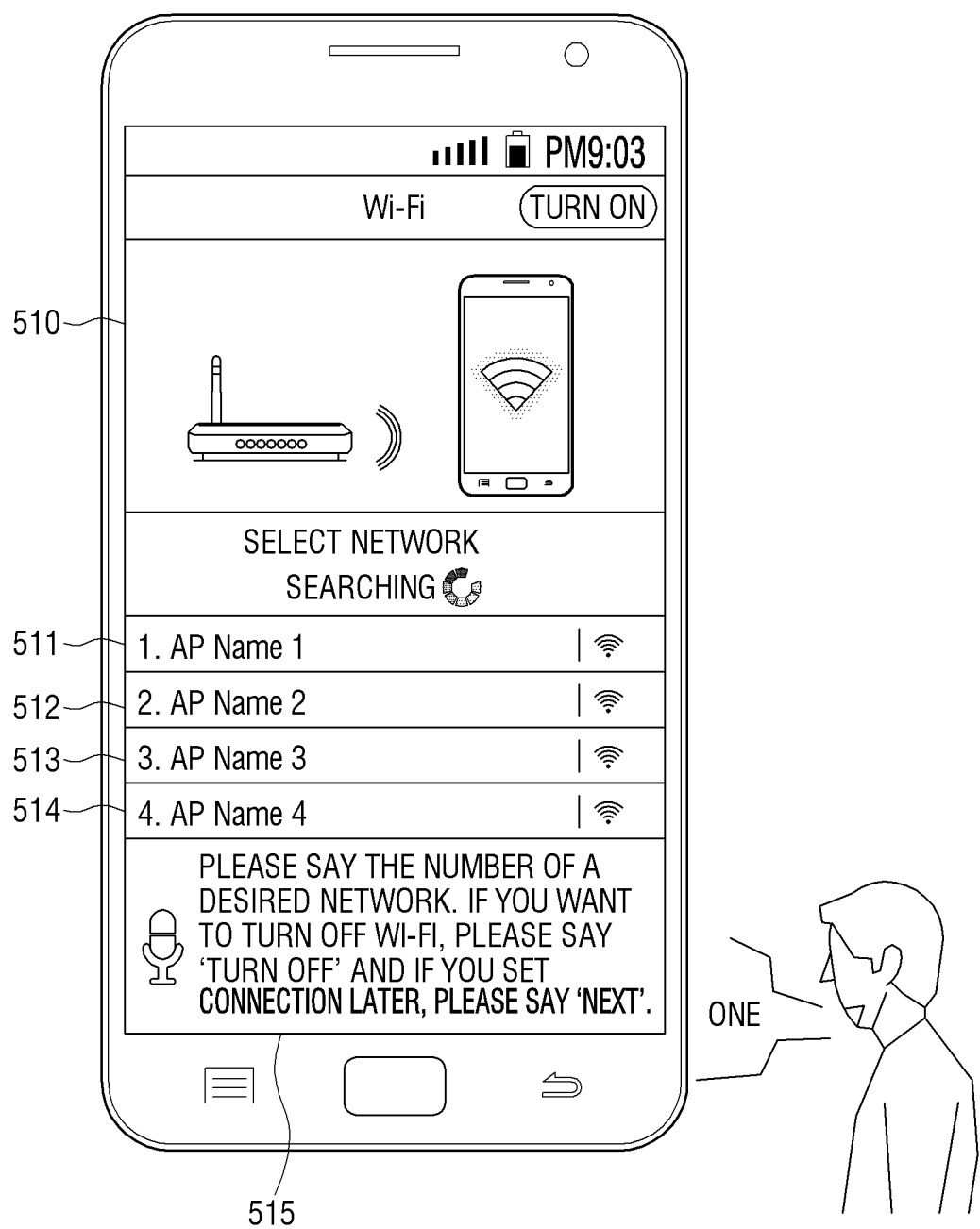

Accordingly, a user may set WiFi network by uttering a number assigned to a desired access point for connection. For example, as illustrated in FIG. 5B, when a user utters "one," the controller 120 may set access point AP Name 1 as a setting value for WiFi network, and receive a setting value for a setting menu which corresponds to the next step.

In the above exemplary embodiment, when a user utters a number, the corresponding WiFi network is set based on a setting value which corresponds to the uttered number, but this is only an example. That is, the controller 120 may set a corresponding setting value even when the name of the setting value is input through a voice.

In response to a user uttering "next" in order to skip the setting for WiFi network, the controller 120 may skip the setting for WiFi network and receive a setting value for a setting menu which corresponds to the next step.

Figure 5C:
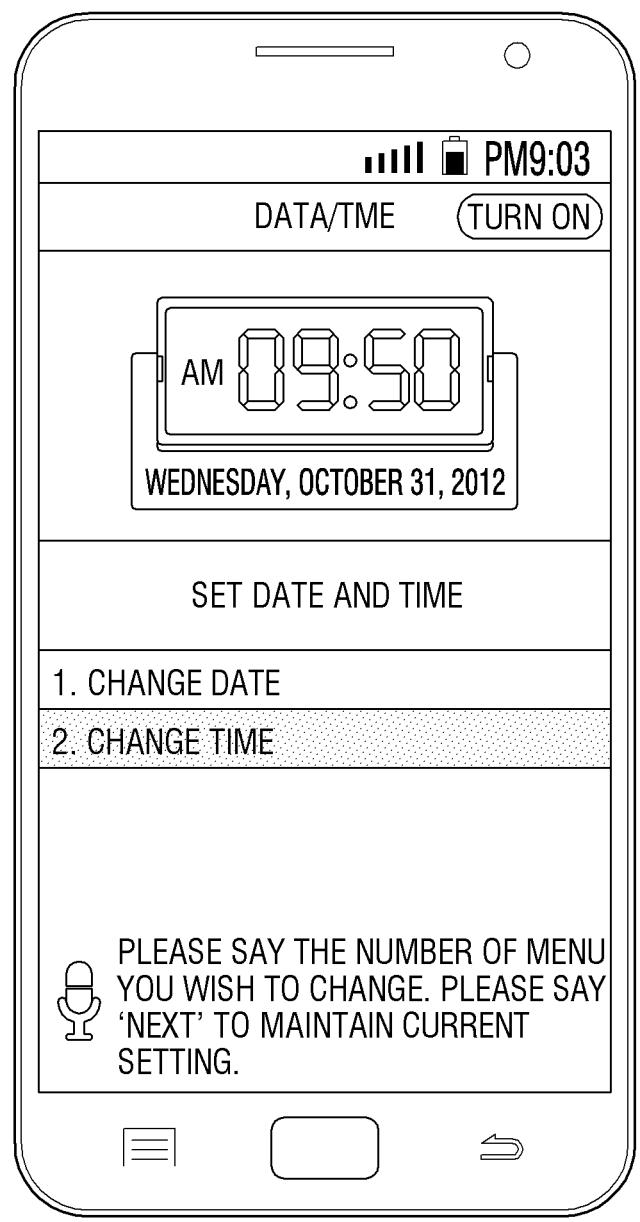
Figure 5D:
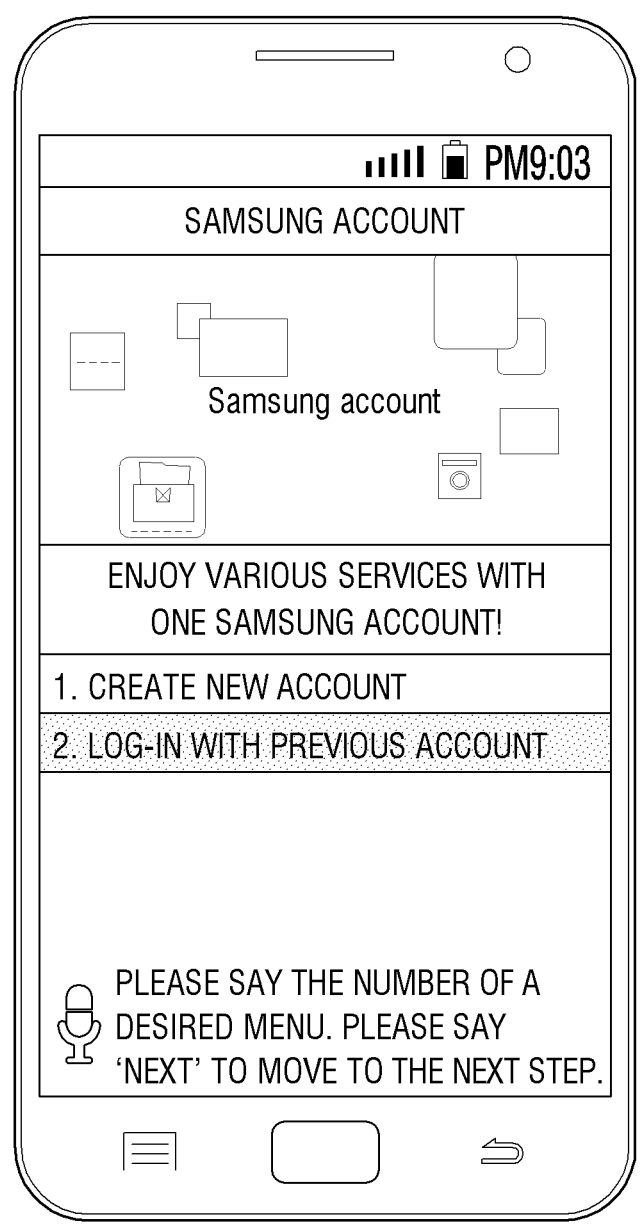

In addition, in response to the setting for WiFi network being completed, the controller 120 may perform initial setting by displaying UIs for receiving setting values for other setting menus sequentially, as illustrated in FIGS. 5C and 5D. In FIGS. 5C and 5D, the initial setting is performed according to a user voice which is input based on the setting item displayed on the UI, and thus a detailed description thereof will not be provided.

In response to a drawing mode being set as an input mode, the controller 120 may receive a setting value for each setting menu which is required for initial setting through a touch manipulation. Herein, the touch manipulation may be a gesture indicating a symbol, a number, etc.

Specifically, the controller may display UIs (or UI screens) including setting items to receive a setting value for each setting menu sequentially, and may set a setting value for the display apparatus 100 for each setting menu based on the setting item which is selected in accordance with an input gesture.

Herein, the UI refers to a UI screen including information regarding a gesture which needs to be input by a user so as to set setting values which can be set for each setting menu and the corresponding setting values. Accordingly, a user may check setting values included in the UI screen, and input a setting value for each setting menu by drawing a gesture which corresponds to a desired setting value.

Figure 6A:
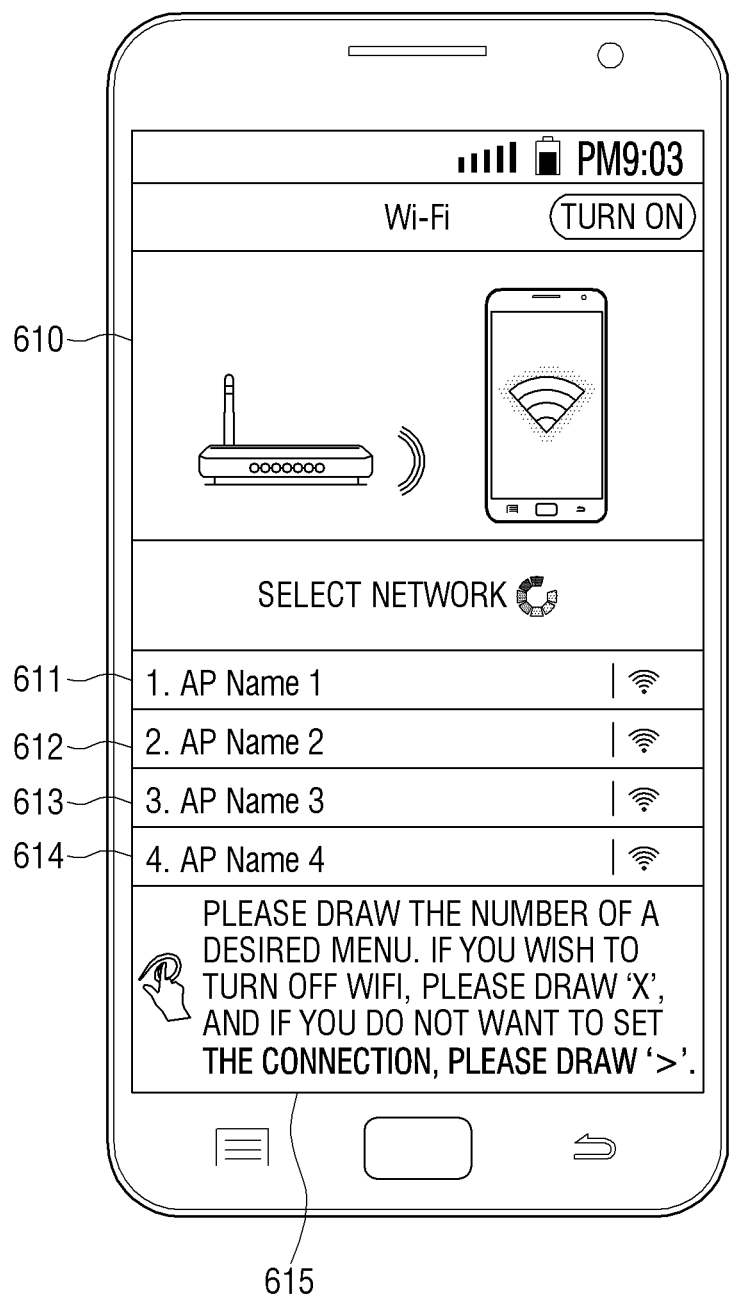

For example, in response to WiFi network setting being input after a language has been set, the controller 120 may output a UI screen 610 for WiFi network setting as illustrated in FIG. 6A. Herein, the UI screen 610 may include the name of access points which can be set for WiFi network and identification symbols (for example, numbers like 611 to 614) which need to be input by the user in order to set the corresponding access points. In addition, the UI screen 610 may include information 615 which needs to be uttered by the user in order to skip the setting for WiFi network.

Figure 6B:
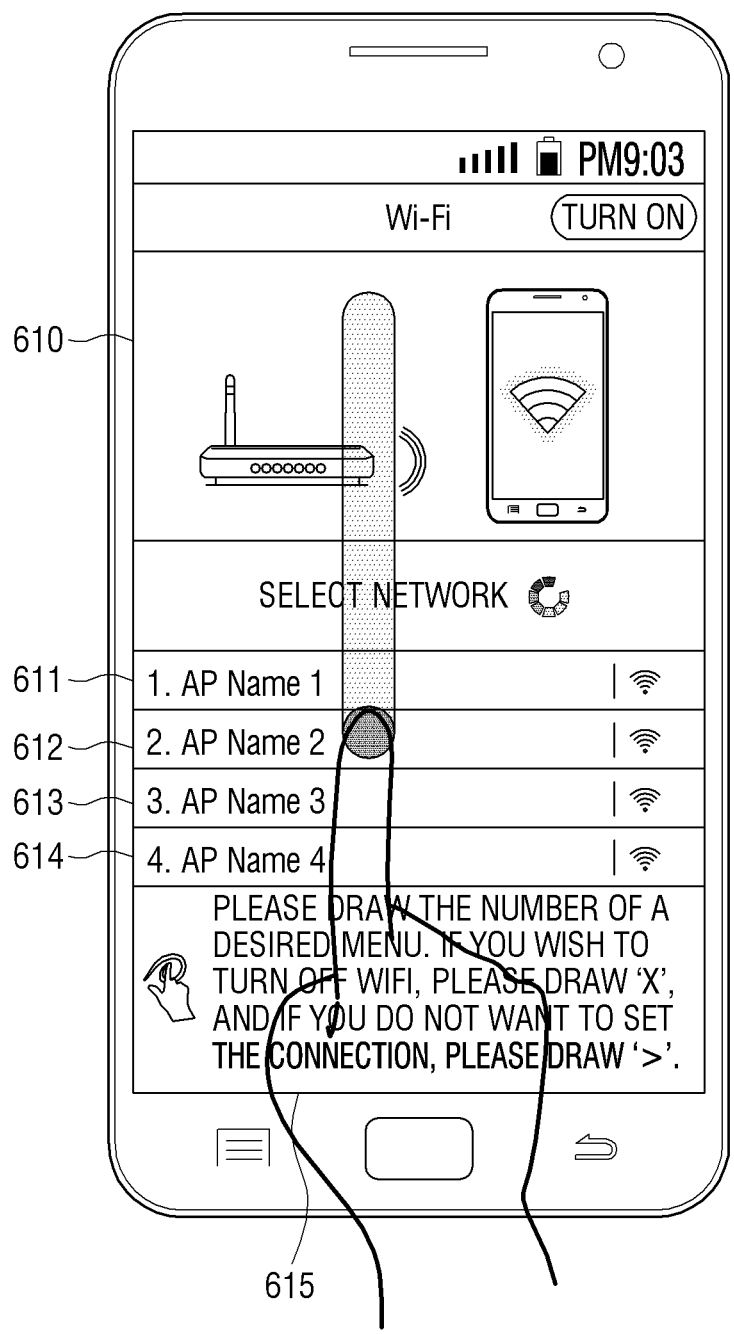

Accordingly, a user may input a setting value for WiFi network by drawing a number assigned to an a desired access point for connection. For example, as illustrated in FIG. 6B, when a user draws the number '1' on the UI screen 610 through a touch manipulation, the controller 120 may display the number '1' on the UI screen 610 following the input drawing trace, and set access point AP Name A as a setting value for WiFi network. In addition, the controller 120 may receive a setting value for a setting menu which corresponds to the next step.

In response to a user drawing a gesture to skip the setting for WiFi network, that is, >, on the UI screen 610, the controller 120 may display the input drawing trace on the UI screen 610, and receive a setting value for a setting menu which corresponds to the next step.

Figure 6C:
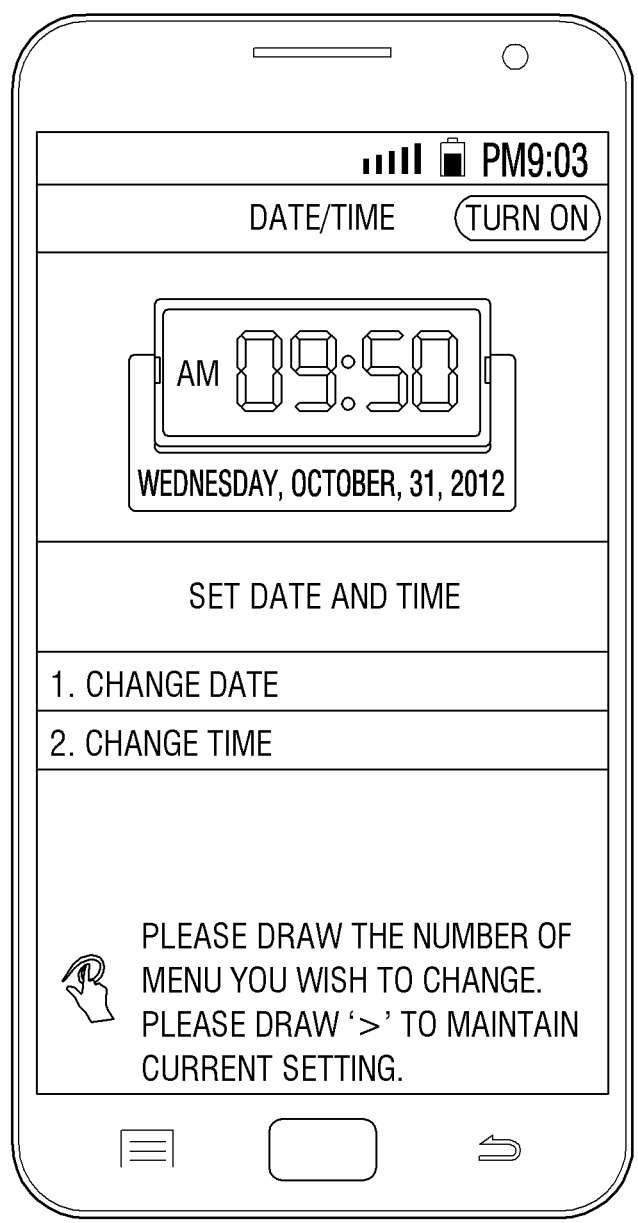
Figure 6D:
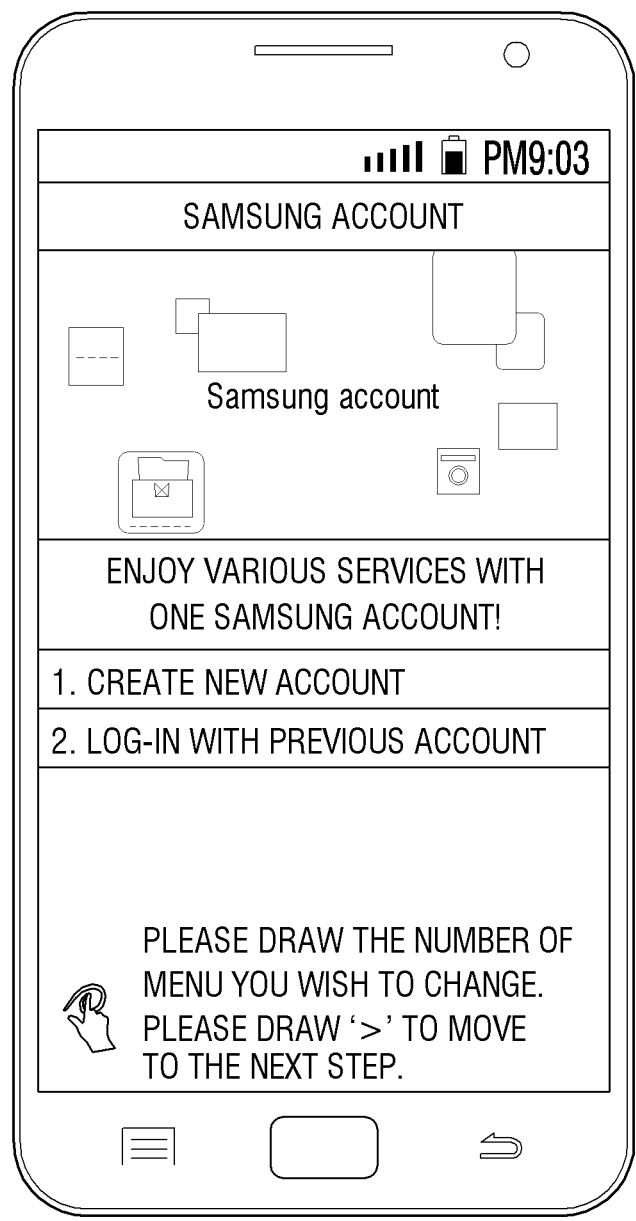

In addition, in response to the setting for WiFi network being completed, the controller 120 may perform initial setting by displaying UIs for receiving setting values for other setting menus sequentially, as illustrated in FIGS. 6C and 6D. In FIGS. 6C and 6D, the initial setting is performed according to a user gesture which is input based on the setting items displayed on the UI, and thus, a detailed description will not be provided.

The controller 120 may provide the function of outputting information displayed on the screen through a voice (hereinafter, referred to as a narration function). Specifically, the controller 120 may output information displayed on the UI screen which is provided in each setting after the initial setting is performed through a voice. For example, the controller 120 may output the detailed contents such as the name of the current setting menu, the image, the setting item, the identification symbol, the input, the text, etc., which are displayed on the current setting menu in the form of a voice. In this case, the controller 120 may also output a method to perform an initial setting in each input mode through a voice.

For example, in response to a touch mode being input as an input mode as illustrated in FIG. 4A, the controller 120 may display an image for WiFi setting on the UI screen 410, display each setting item on the lower portion of the image, and output information that WiFi network can be set by touching the setting item through a voice. In this case, the controller 120 may output the name of each setting item through a voice.

However, this is only an example, and the narration function may also be provided in response to a voice mode or a drawing mode being set as an input mode.

The controller 120 may turn off the narration function in response to a predetermined user command being input. Herein, the predetermined user command may be a command to select a specific button on the display apparatus 100 for a predetermined number of times (for example, select a home button twice).

In addition, the controller 120 may perform a talkback function in response to a predetermined user command being input. Herein, the talkback function is similar to the narration function in that both functions output information displayed on the screen through a voice, but the talkback function is distinct from the narration function in that the talkback function outputs a voice whenever a specific touch manipulation is input.

For example, in response to a specific button on the display apparatus 100 being selected for a predetermined number of times (for example, select a home button three times) or a specific gesture is input on the screen according to a touch manipulation, the controller 120 may perform the talkback function.

Specifically, in response to a specific touch manipulation (for example, tap, flick, etc.) being input after the talkback function is performed according to a predetermined user command, the controller 120 may output the name of the current setting menu, the setting item, the identification symbol, the input text, etc. for the corresponding setting menu in the form of a voice. Accordingly, depending on the case, the controller 120 may recognize a touch manipulation which corresponds to a specific gesture in a touch mode, recognize a touch manipulation by activating a touch sensor in a voice mode, or recognize a touch manipulation except for a specific gesture in a drawing mode.

The controller 120 may output a UI (hereinafter, a guide UI screen) including guide information regarding each input mode. The guide UI screen may be a screen to guide a user regarding a method of inputting a setting value in each input mode which is set. Accordingly, the guide UI screen may be a UI screen having various forms according to an input mode.

Figure 7A:
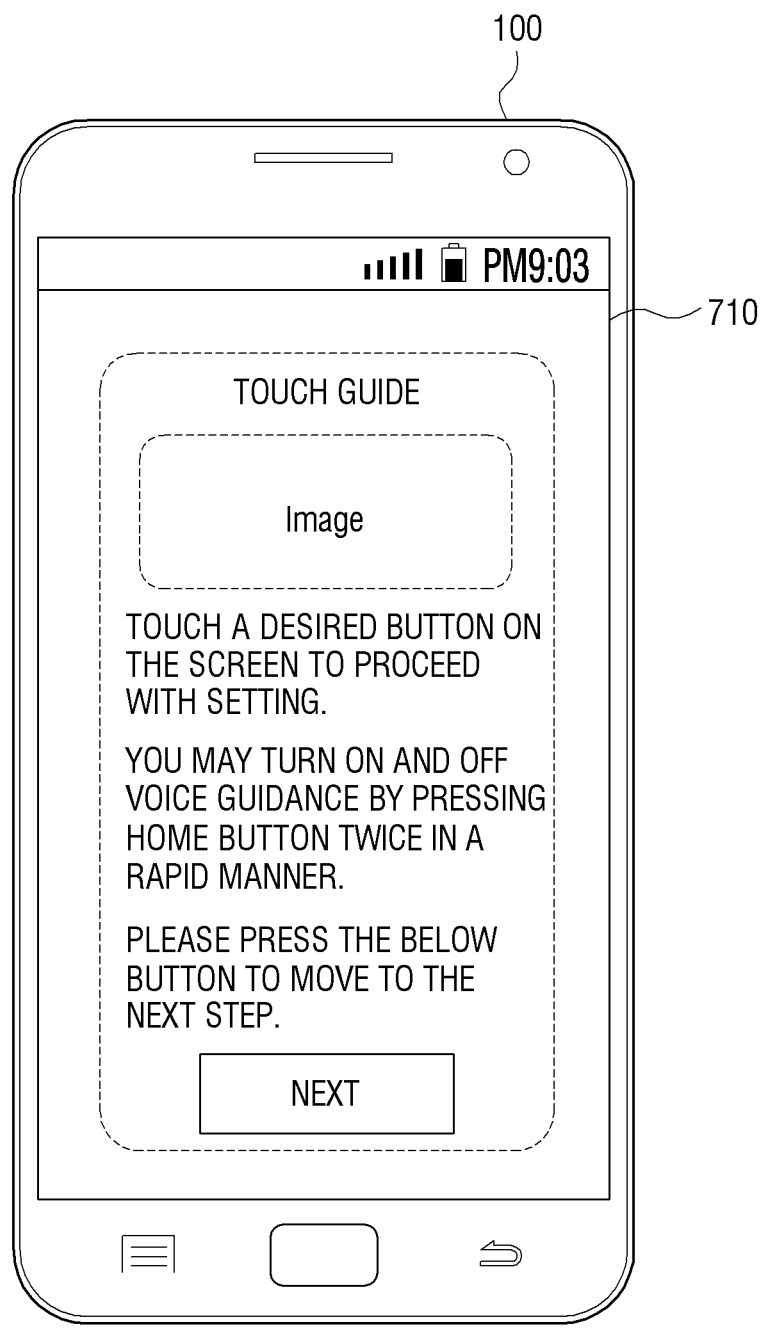

For example, in response to a touch mode being set as an input mode, the controller 120 may display a guide UI screen 710 including information that a setting value can be input by touching a setting item for each setting mode in the touch mode as illustrated in FIG. 7A.

Figure 7B:
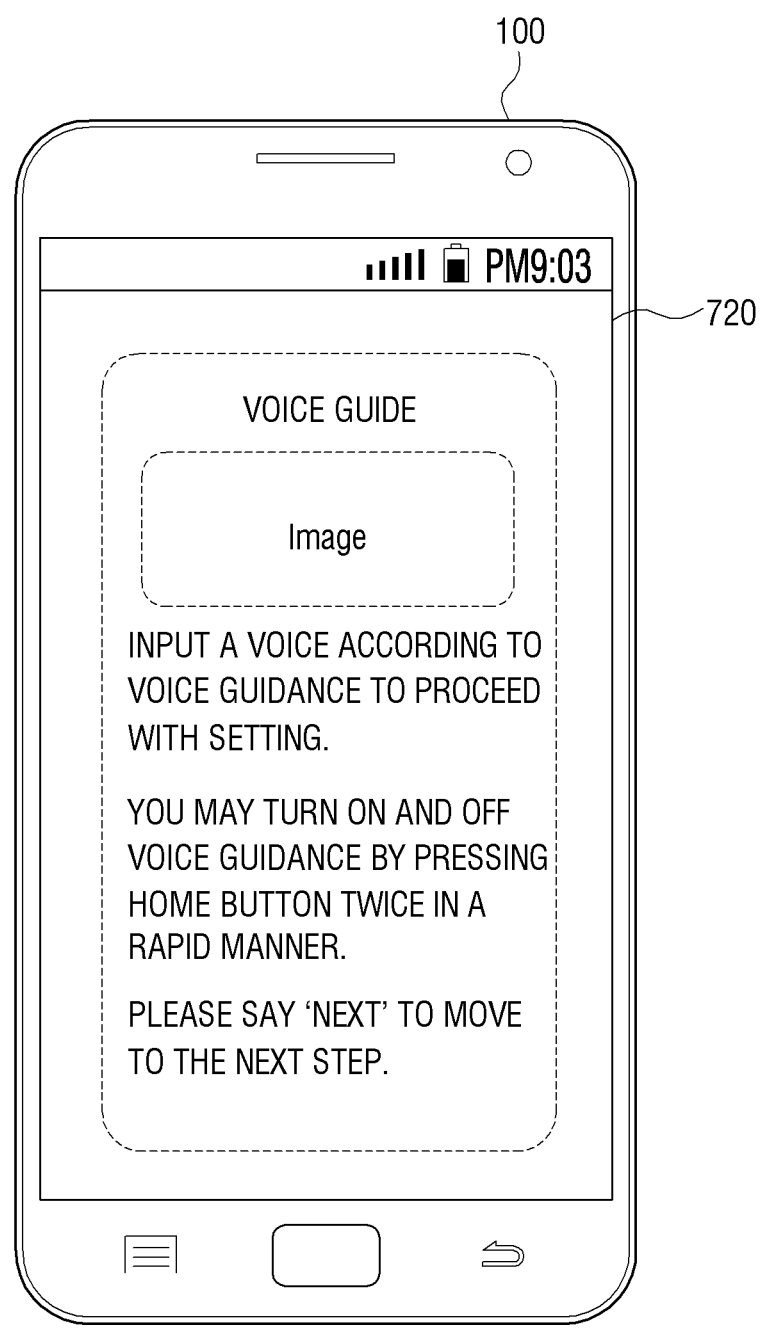

In addition, in response to a voice mode being set as an input mode, the controller 120 may display a guide UI screen 720 including information that a setting value can be input by uttering an identification symbol which corresponds to a setting item for each setting menu in the voice mode as illustrated in FIG. 7B.

Figure 7C:
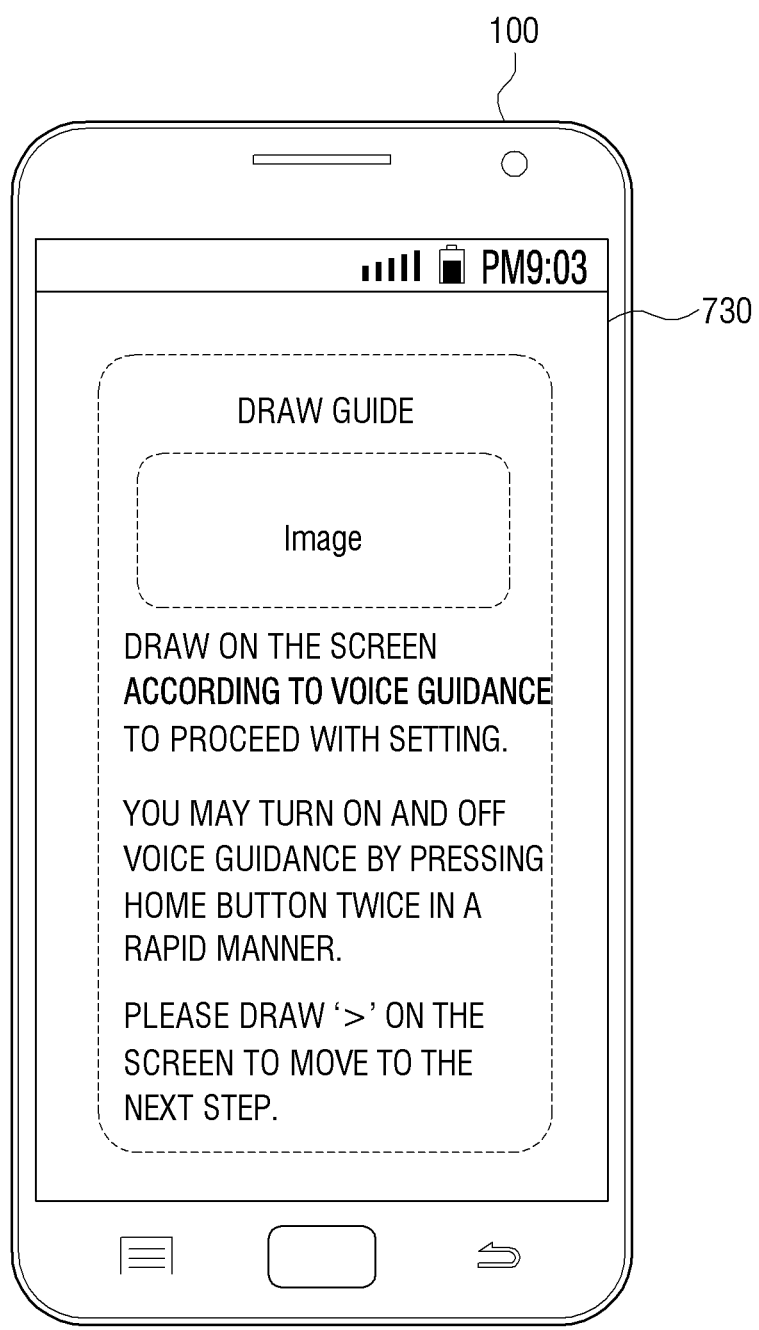

Further, in response to a drawing mode being set as an input mode, the controller 120 may display a guide UI screen 730 including information that a setting value can be input by drawing an identification symbol corresponding to a setting item for each setting menu in the drawing mode as illustrated in FIG. 7C.

The controller 120 may display a guide UI screen after an input mode is set.

According to an exemplary embodiment, the display apparatus 100 may provide an environment setting method which is tailored to a user. That is, in response to initial setting for the display apparatus 100 (for example, language, WiFi network, date/time, user account, etc.) being completed, the controller 120 may provide a user-customized environment setting for setting the environment for each user. In addition, the controller may set a user-customized environment setting to correspond to a touch manipulation or a voice based on an input mode.

The controller may provide a user-customized environment setting UI through a wizard method, a check-list method, or a menu method. Herein, the menu method is a touch-based method for the existing menu, so detailed description thereof will not be provided.

In addition, in response to a predetermined user command being input, the controller 120 may output information through a voice regarding a current location on the screen. Herein, the predetermined user command may be a manipulation of shaking the display apparatus 100, and the display apparatus 100 may include a sensor (not shown) to detect the manipulation of shaking the display apparatus 100.

Accordingly, in response to the manipulation of shaking the display apparatus 100 being input, the controller 120 may output the name of the current setting menu through a voice. In addition, in response to the manipulation of shaking the display apparatus 100 being input, the controller 120 may output information regarding the location where a cursor is located on the setting menu through a voice.

FIG. 8 is a view provided to explain a method for briefly setting a user-customized environment according to an exemplary embodiment.

Figure 8A:
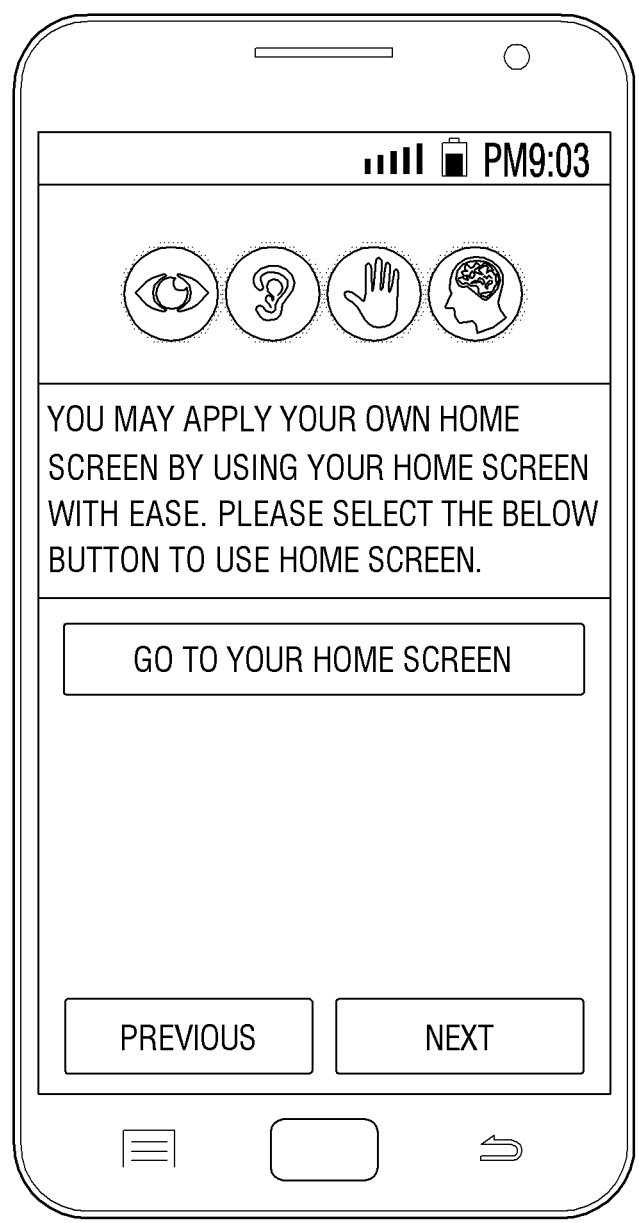

As illustrated in FIG. 8A, in response to initial setting for the display apparatus 100 being completed, the controller 120 may display a guide screen for a user-customized environment setting. For example, the menu item of "Go to your home screen" may be displayed along with the message, "You may conveniently apply a home screen using your own home screen. If you want to use your own home screen, please select the below button."

Figure 8B:
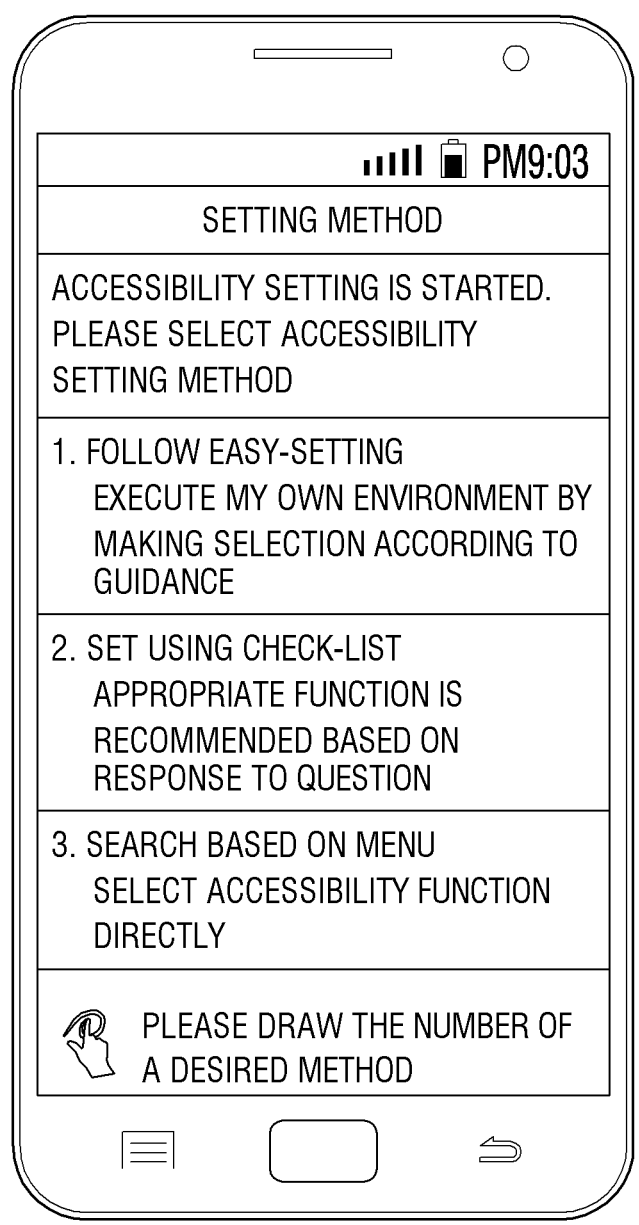

In response to a gesture to select the menu item of "Go to your home screen" being input on the screen illustrated in FIG. 8A, a screen to select an accessibility setting method may be displayed as illustrated in FIG. 8B. That is, a UI screen including "i) follow for easy setting" to select a wizard method, "ii) set using check-list" to select a check-list method, and "iii) search based on menu" to select a menu method may be displayed as illustrated in the drawing. In this case, each item may be selected using a previously-set input mode, for example, a drawing method. That is, in response to the number of a desired method being drawn, the corresponding method may be selected.

FIGS. 9 and 10 are views provided to explain a method for setting a user-customized environment using a wizard method, according to an exemplary embodiment. As illustrated in FIGS. 9 and 10, according to the wizard method, accessibility may be recommended and set through a simple disability diagnosis. In FIGS. 9 and 10, the wizard method is provided in a voice mode and a drawing mode, respectively, but this is for convenience of explanation. The wizard method may also be provided in a touch mode according to a previously-set input mode.

FIG. 9 is a view provided to explain a wizard method which is performed in a voice mode according to an exemplary embodiment.

Figure 9A:
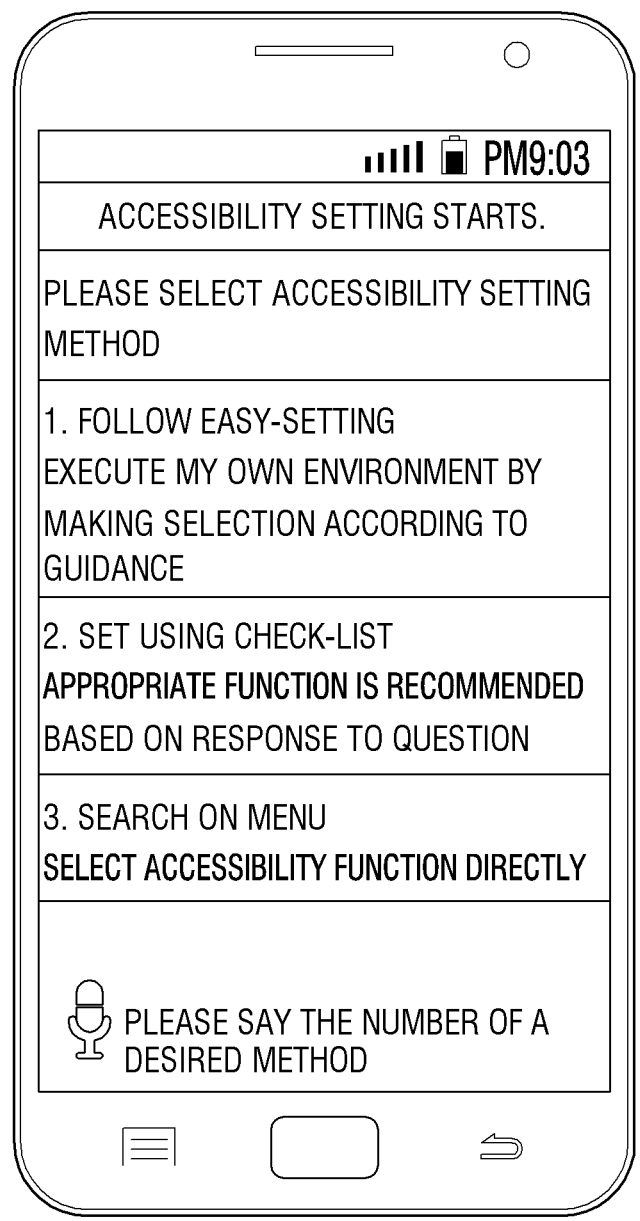

For example, when the wizard mode as illustrated in FIG. 9A, that is, "follow easy setting" is selected, a test for a user-customized environment setting may be conducted.

Figure 9B:
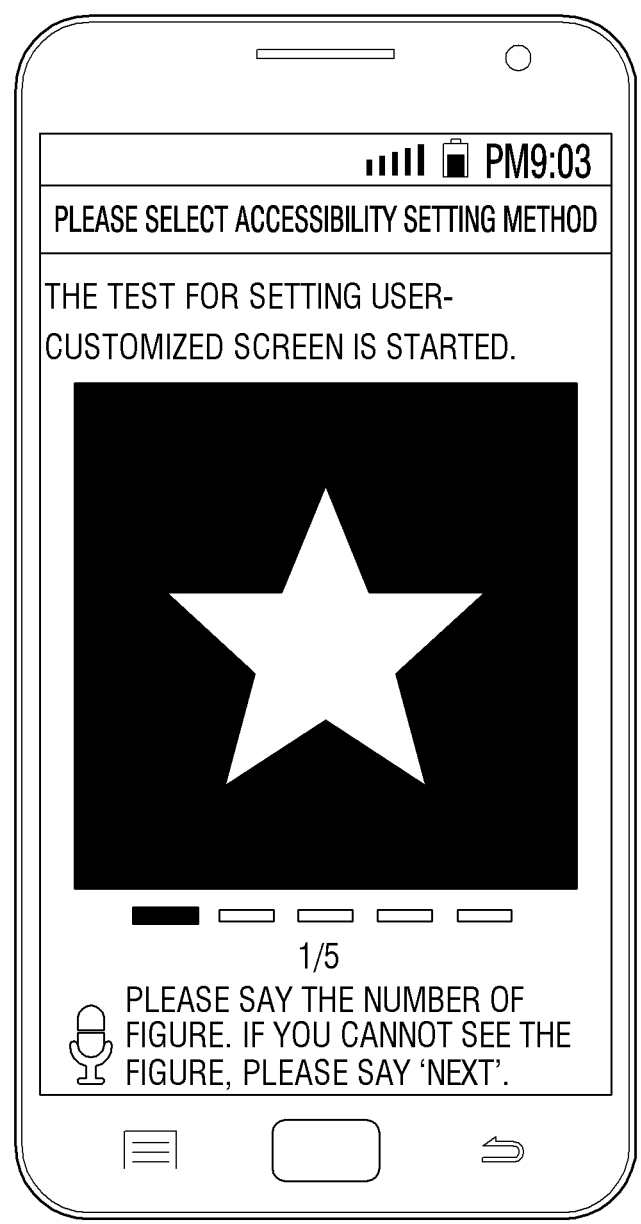

As illustrated in FIG. 9B, a specific figure may be displayed, and a voice guide which requests a user to utter the name of the corresponding figure may be output. Accordingly, the display apparatus may determine the degree of the visual disability of the user.

Figure 9C:
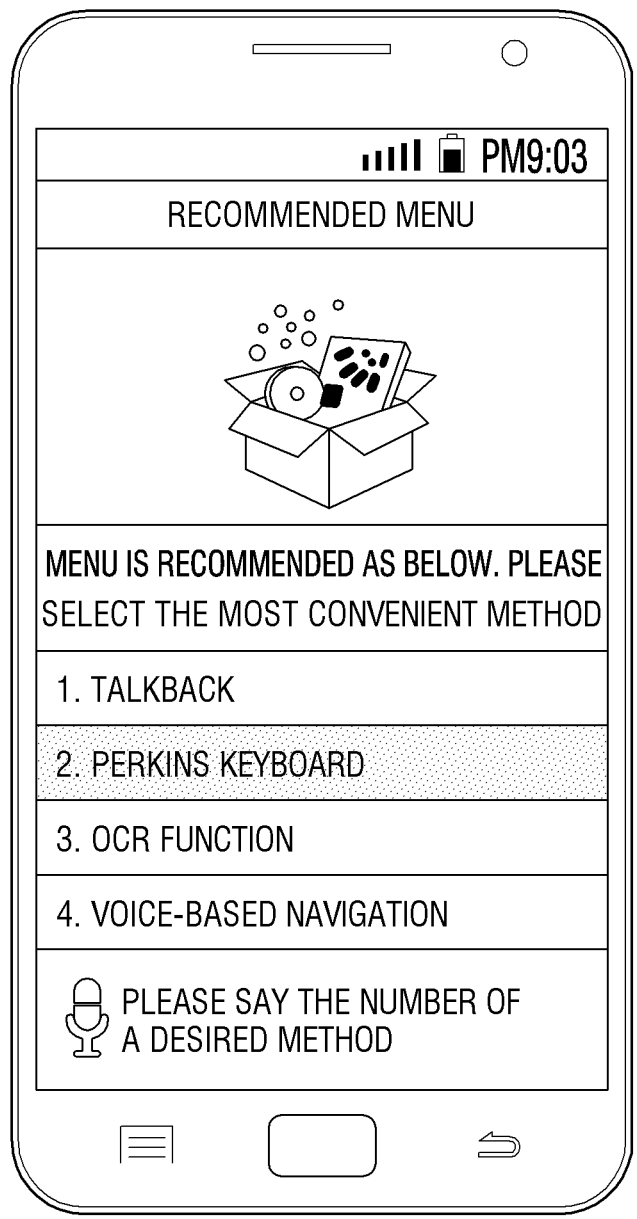

Subsequently, as illustrated in FIG. 9C, a recommendation menu may be displayed. For example, the recommendation menu may be a menu suitable for those with visual disability, such as a talkback, a Perkins keyboard, and a voice-based navigation. In this case, the corresponding menus may be provided through a voice.

Figure 9D:
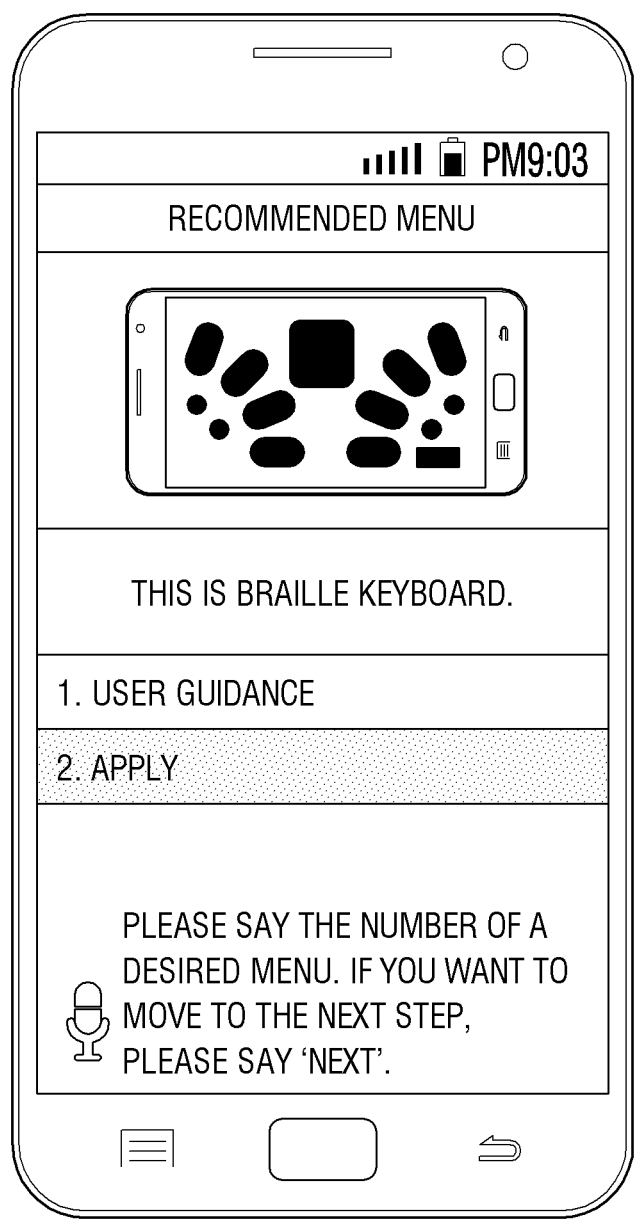

When a user selects a Perkins keyboard, a keyboard for braille input may be provided as illustrated in FIG. 9D.

Meanwhile, each menu item may be provided through a voice in a voice mode as illustrated in FIG. 9, and an icon indicating the voice mode and a guide for voice input for each step may be provided.

FIG. 10 is a view provided to explain a wizard method which is performed in a drawing mode.

Figure 10A:
Figure 10B:
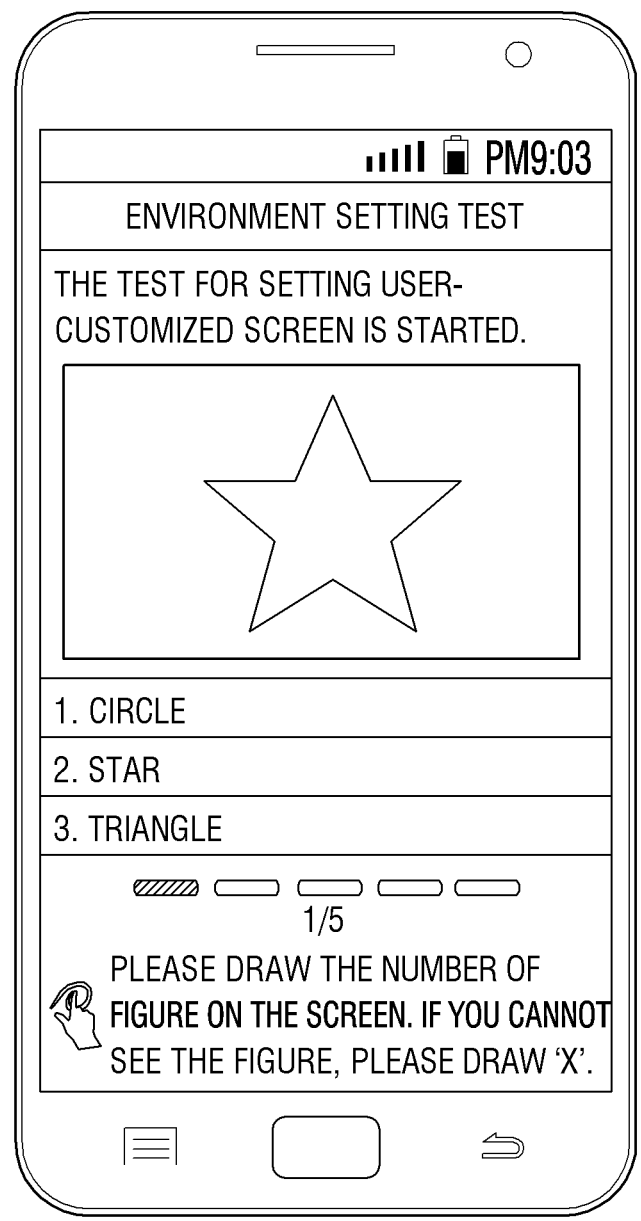
Figure 10C:
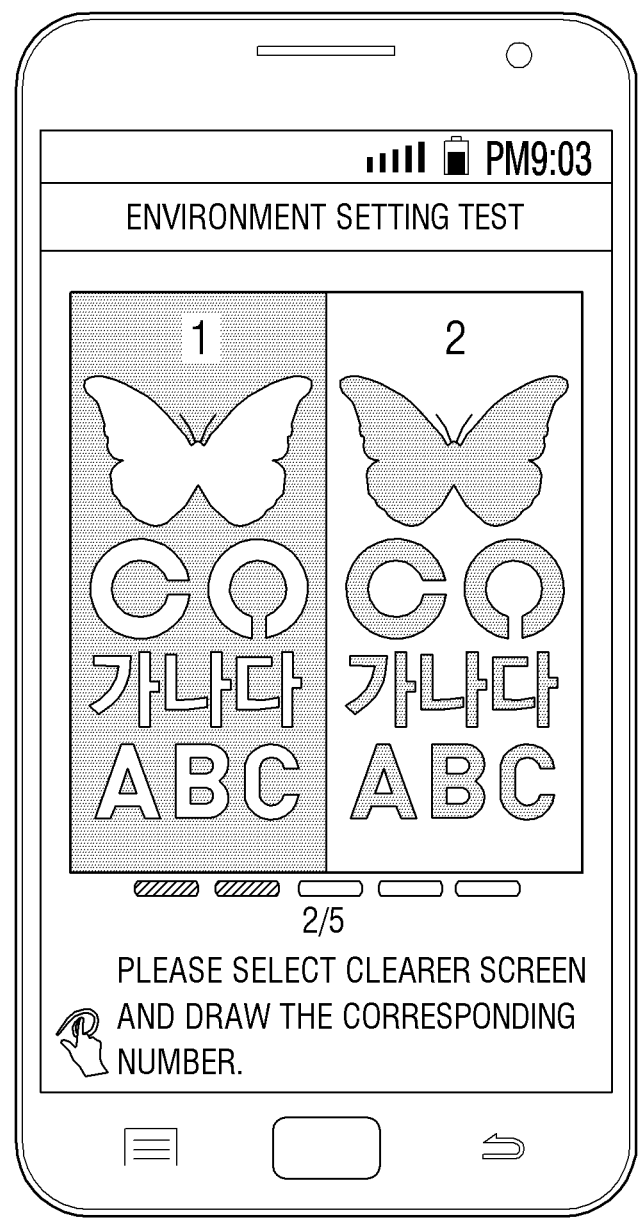
Figure 10D:
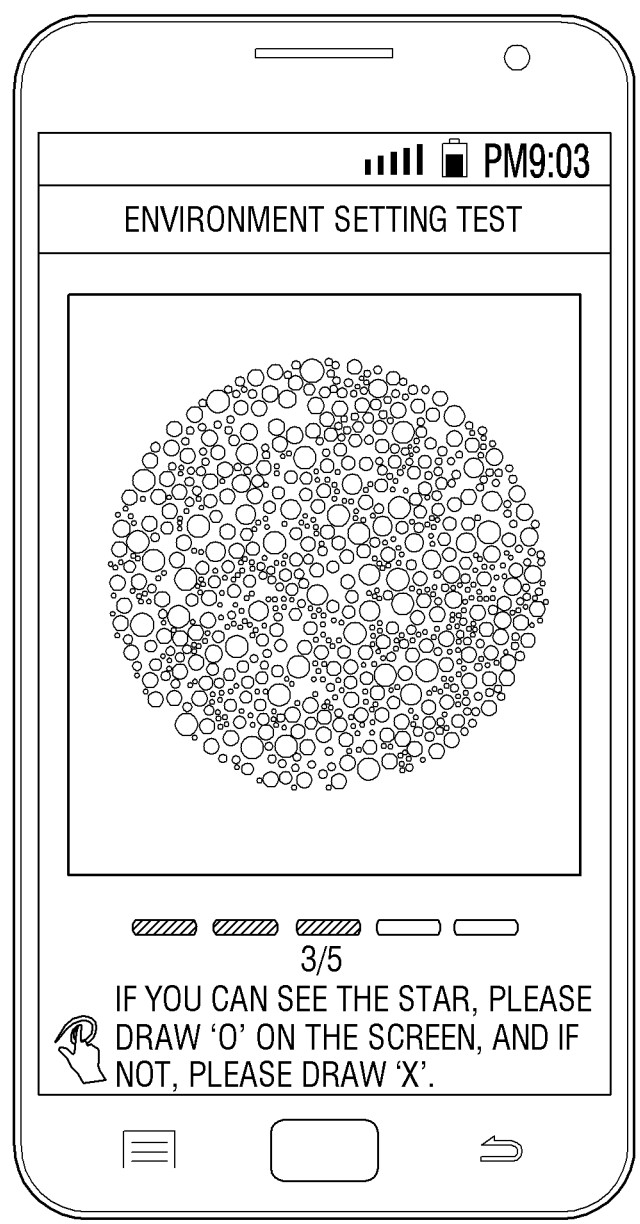
Figure 10E:
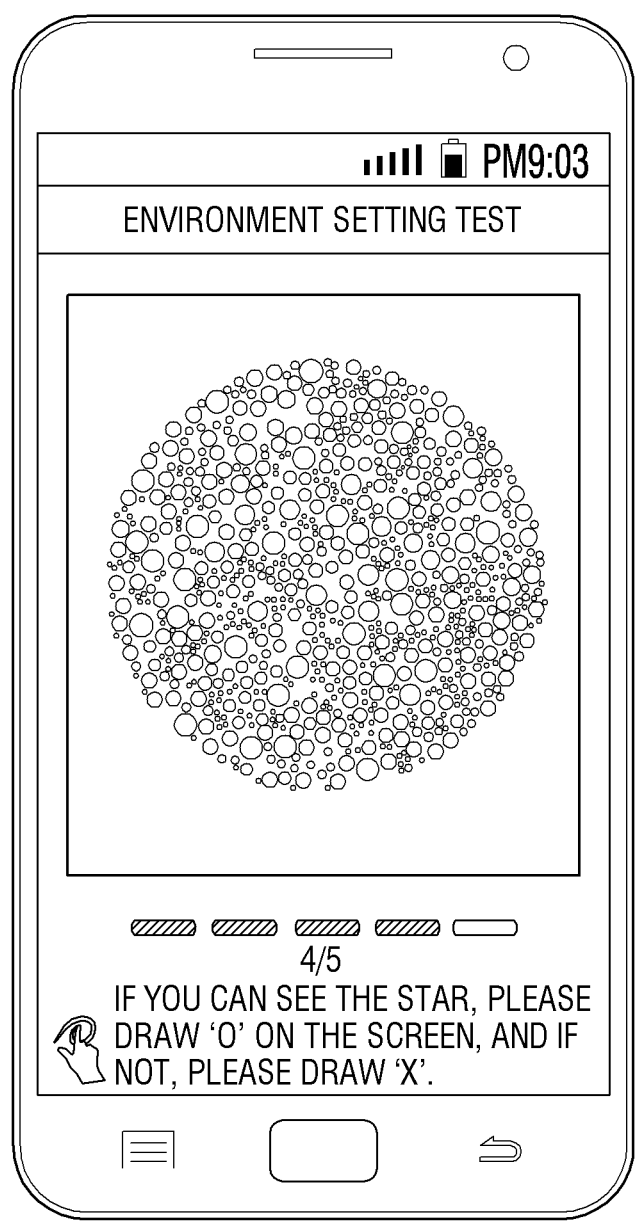
Figure 10F:
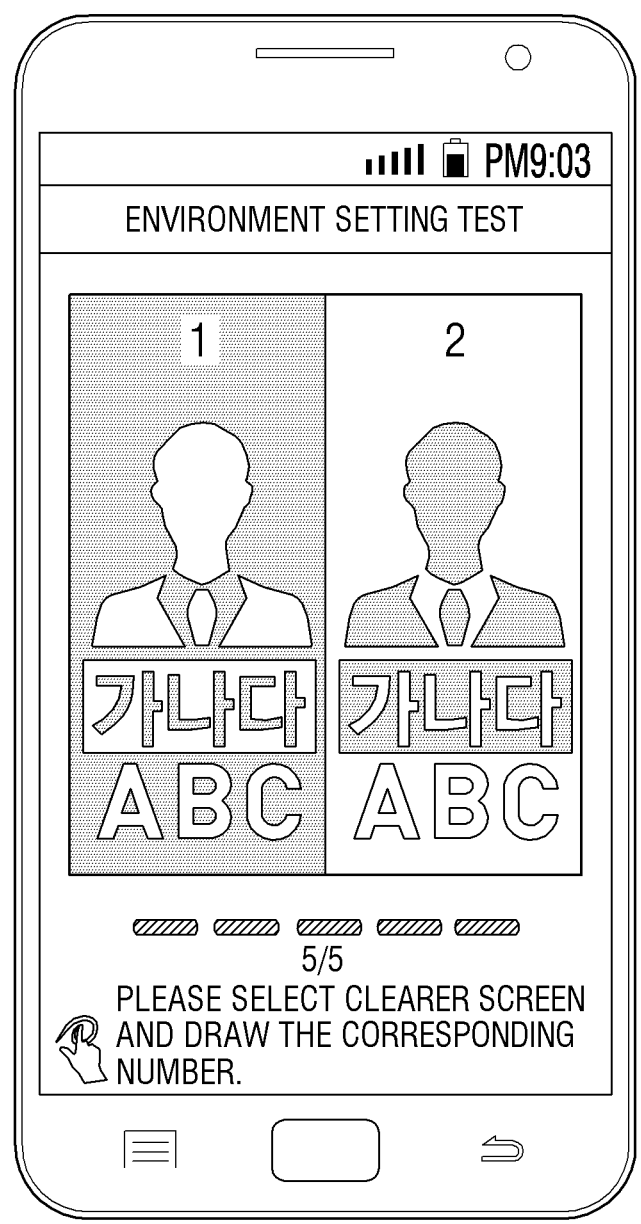

For example, a UI screen for a user accessibility setting may be provided as illustrated in FIG. 10A, and information to guide a user-customized environment setting may be displayed on the UI screen. For example, the UI screen may include the description regarding "user customized environment" and the description regarding whether to select "user customized environment".

Subsequently, in response to a user selecting the customized environment setting, an environment setting test screen may be displayed as illustrated in FIGS. 10B to 10F. For example, various UI screens to text vision may be displayed as illustrated in FIGS. 10B to 10F.

Figure 10G:
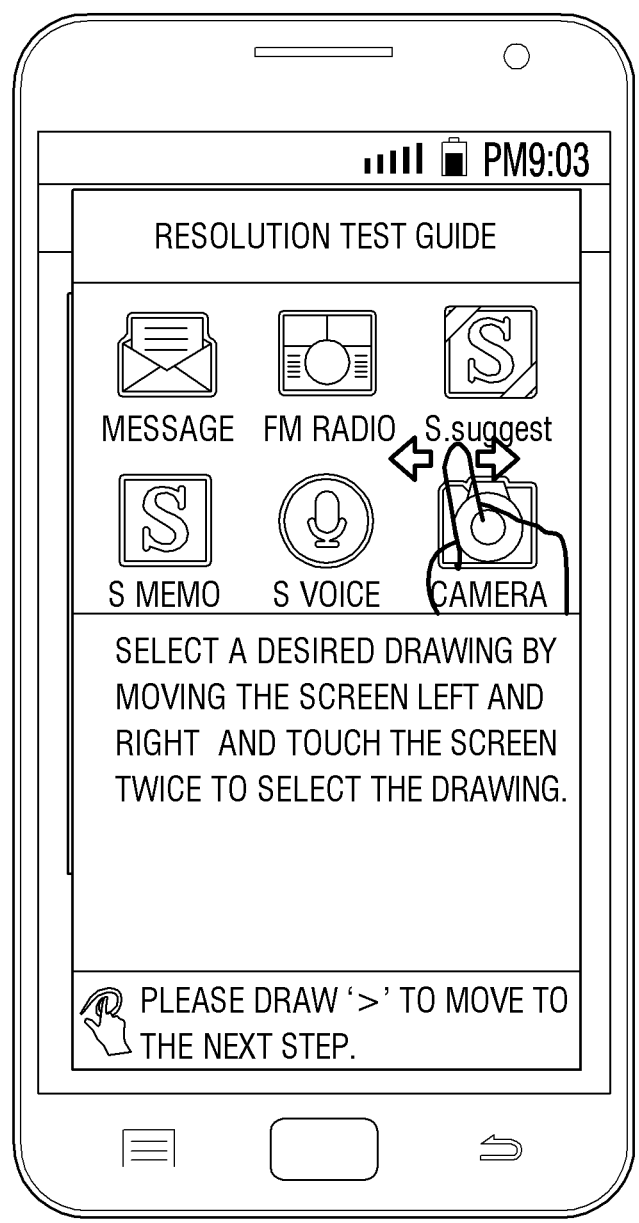
Figure 10H:
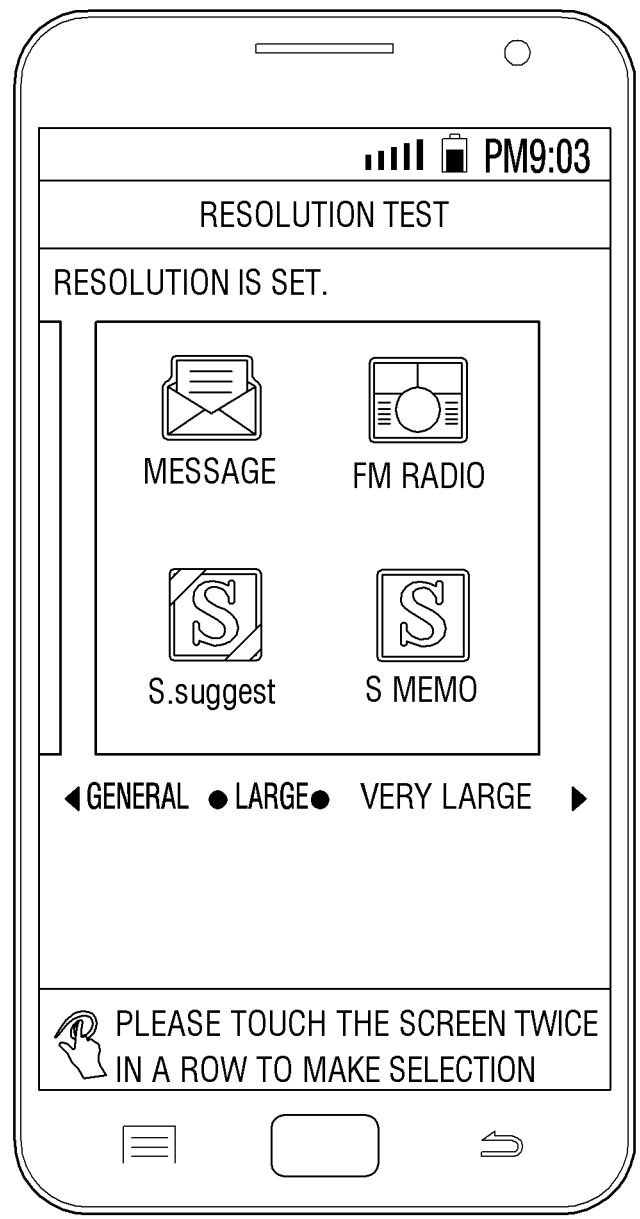

In addition, a guide screen to test resolution may be displayed as illustrated in FIG. 10G, and a resolution test screen may be displayed as illustrated in FIG. 10H.

Figure 10I:
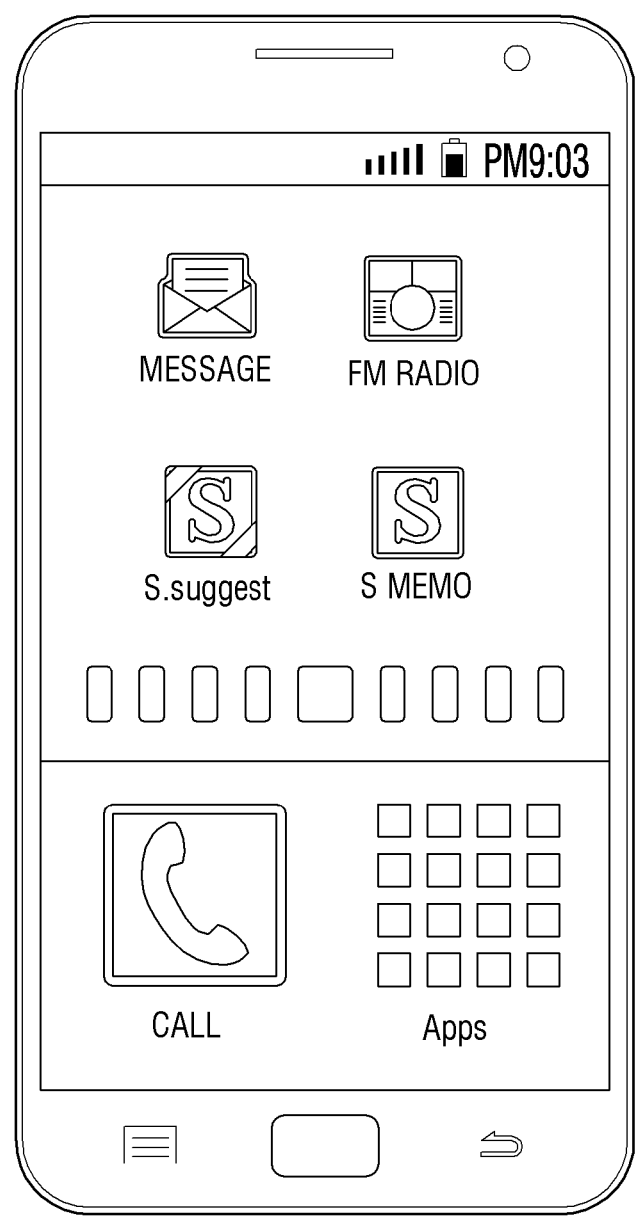

When resolution is set on the screen of FIG. 10H, a screen which corresponds to the resolution may be displayed as illustrated in FIG. 10I.

As such, the controller 120 may set a user-customized environment based on a user test result according to the wizard method, and may operate the display apparatus 100 according to the set environment.

Figure 10J:
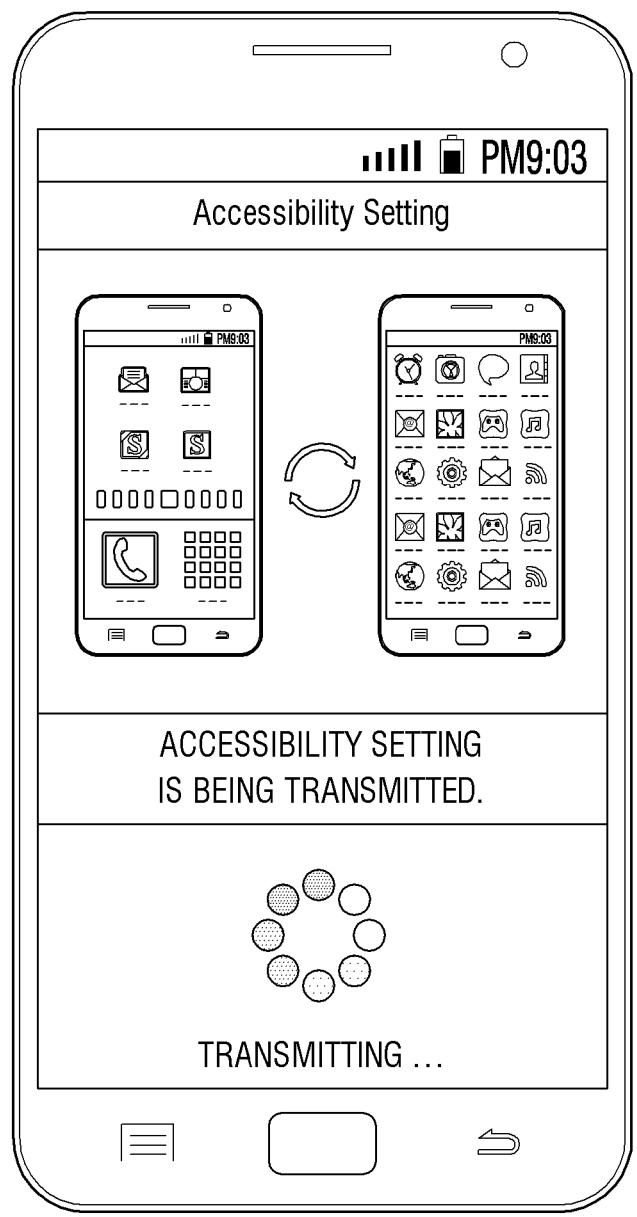

When the setting is completed, depending on occasions, accessibility setting information of which setting is completed according to a predetermined event may be transmitted to another display apparatus. As illustrated in FIG. 10J, a UI screen indicating the accessibility setting information is transmitted to another display apparatus may be provided.

In this case, a user may perform a test provided in the wizard method by drawing a specific gesture. As described above, an icon which indicates that the corresponding mode is a drawing mode and a guide for drawing input in each step may be provided.

FIG. 11 is a view provided to explain a method for setting a user-customized environment using a check-list method, according to an exemplary embodiment. As illustrated I FIG. 11, the method for selecting a specific item from a list of items of inconvenience and making recommendations may be used in the check-list method. For convenience of explanation, it is assumed in this exemplary embodiment that the check-list method is provided in a touch mode. However, depending on the occasion, the check-list method may be provided in a voice mode or in a drawing mode according to a previously-set input mode.

Figure 11A:
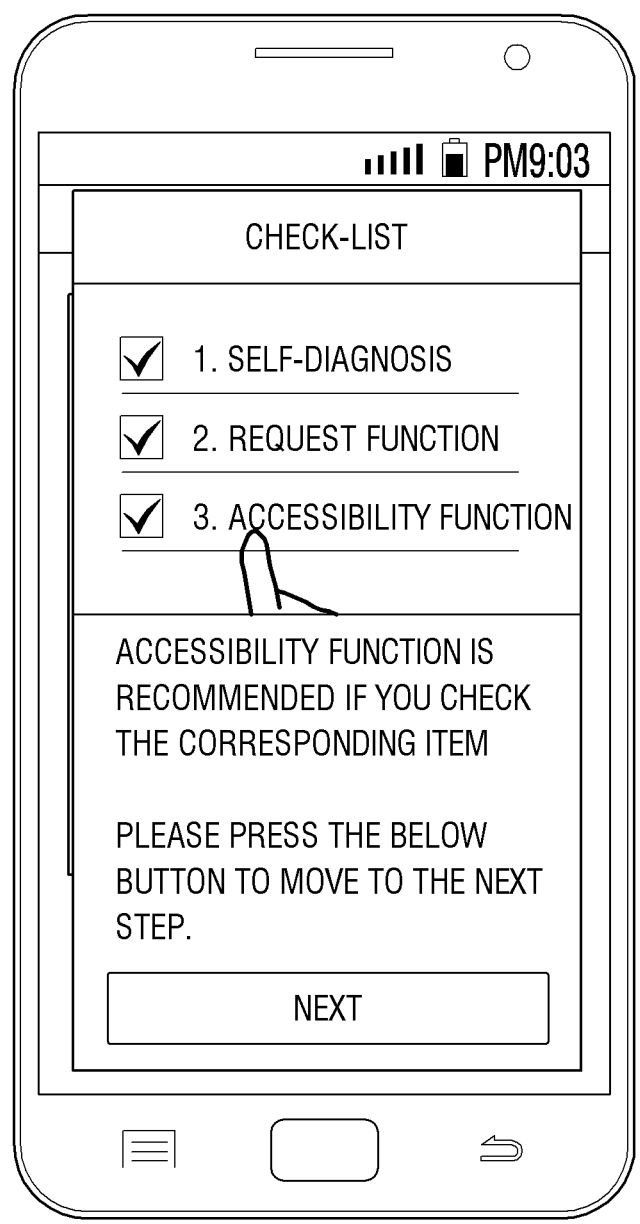

For example, as illustrated in FIG. 11A, a menu item for self-analysis, a menu item for a request function, and a menu item for an accessibility function may be displayed, and the corresponding menu item may also be provided in the form of a check-list.

Figure 11B:
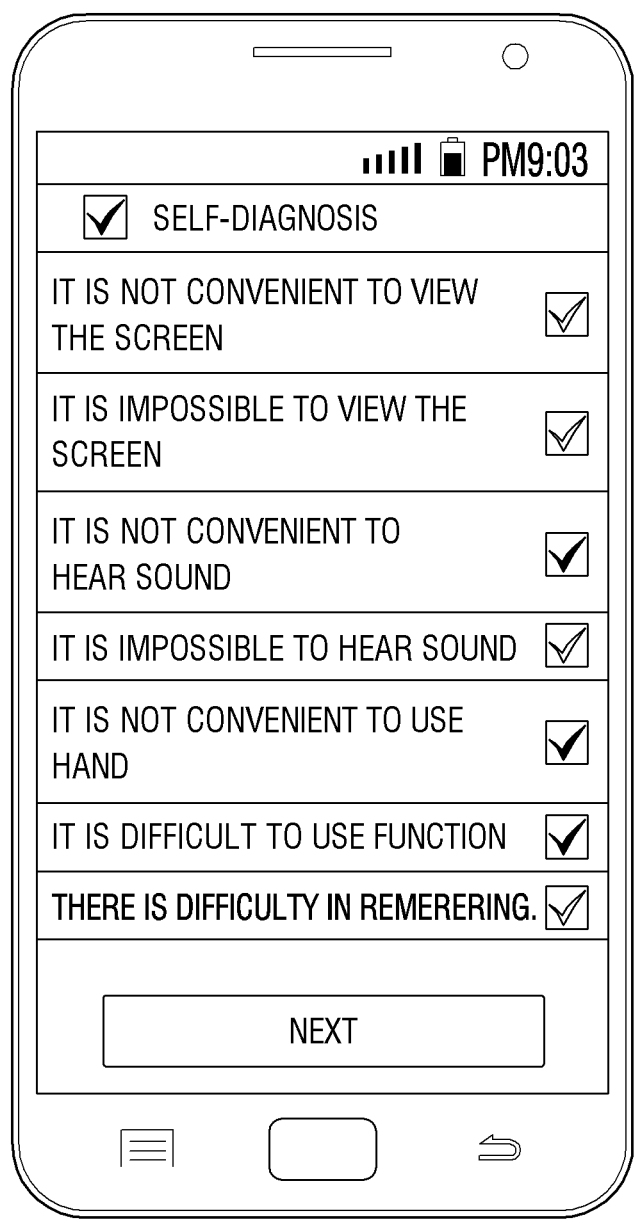

In response to the menu item for self-analysis is selected, various diagnosis items for self-analysis may be provided in the form of check-list as illustrated in FIG. 11B.

Figure 11C:
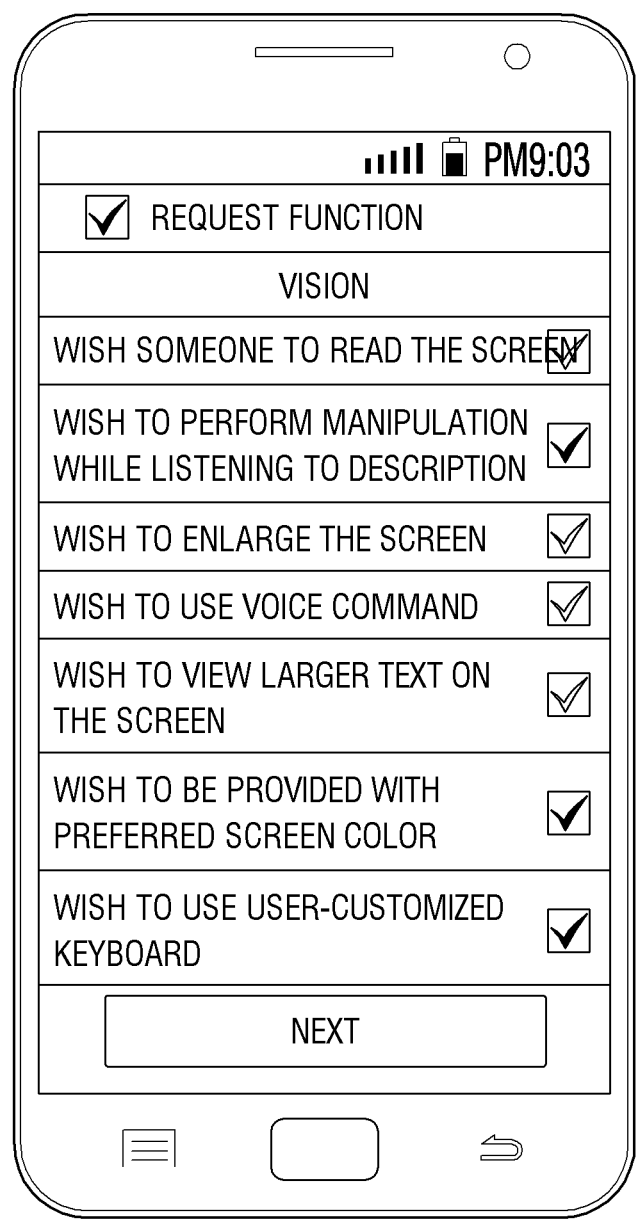

In response to the menu item for a request function being selected, various request functions may be provided in the form of check-list, as illustrated in FIG. 11C.

Figure 11D:
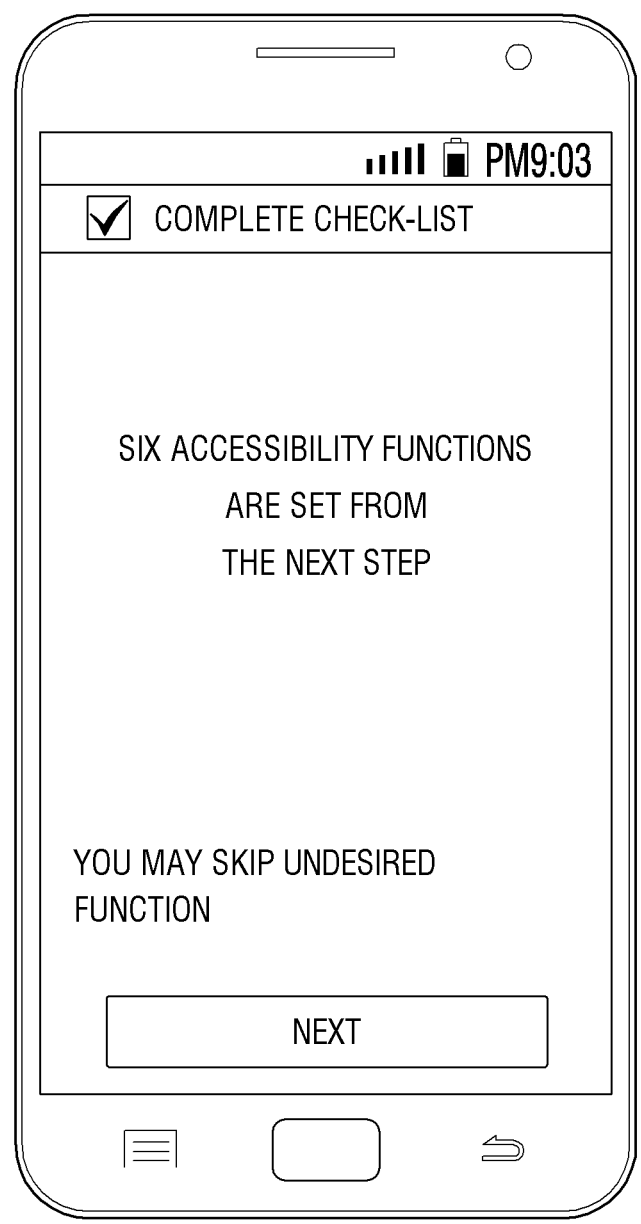

In addition, depending on the occasion, a guide screen to guide the next step may be displayed as illustrated in FIG. 11D. For example, in response to the setting for the accessibility function being left, a guide screen guiding the setting for the corresponding function to be performed next may be displayed, as illustrated in the drawing.

Subsequently, the controller 120 may set a user-customized environment based on a user response to the self-analysis and the request function, and drive the display apparatus 100 according to the set environment.

FIG. 12 is a view provided to explain a method of sharing information regarding the initial setting of a display apparatus, according to an exemplary embodiment.

According to an exemplary embodiment, in response to the initial setting of a display apparatus being completed, the initial setting information may be transmitted to an external apparatus. Herein, the external apparatus may include at least one of another display apparatus, an external server, and a near-field wireless communication tag.

Figure 12A:
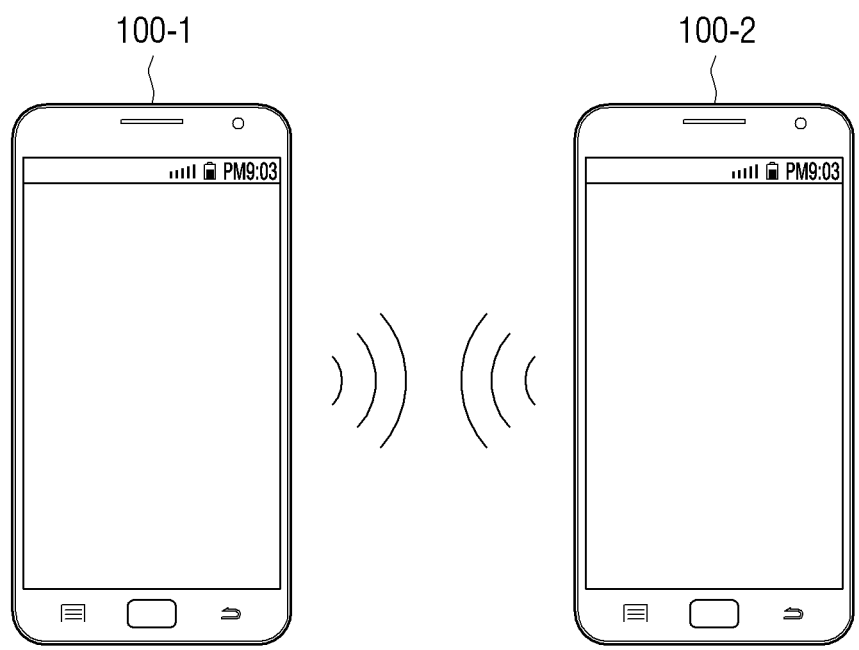

Specifically, as illustrated in FIG. 12A, the controller 120 may control to store initial setting information which is completed in a display apparatus 100-1 in the display apparatus 100-1, and transmit the information to a display apparatus 100-2 of another user. For example, information regarding completed initial setting may be transmitted to another display apparatus according to various communication standards such as Bluetooth®, WiFi, NFC tagging, etc. In the case of the NFC tagging, for example, the controller 120 may record the completed initial setting information on an NFC tag provided on the display apparatus 100-1, and in response to the display apparatus 100-2 having an NFC reader approaching, transmit the initial setting information recorded in the NFC tag to the display apparatus 100-2.

Figure 12B:
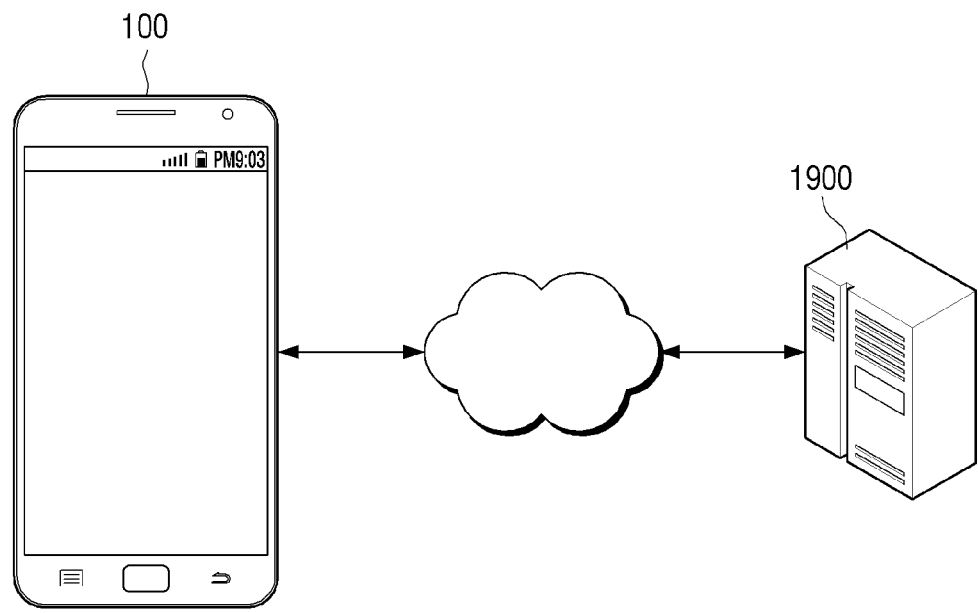

In addition, as illustrated in FIG. 12B, the controller 120 may transmit the initial setting information completed in the display apparatus 100 to a cloud server 1900. For example, information regarding the completed initial setting may be transmitted to the cloud server 1900 according to various communication standards such as WiFi, 3rd Generation, 3rd Generation Partnership Project, Long Term Evolution(LTE), etc. In this case, the cloud server 1900 may classify the received initial setting information into at least one of user account, disability type, and disability information, and may store and manage the information.

Figure 12C:
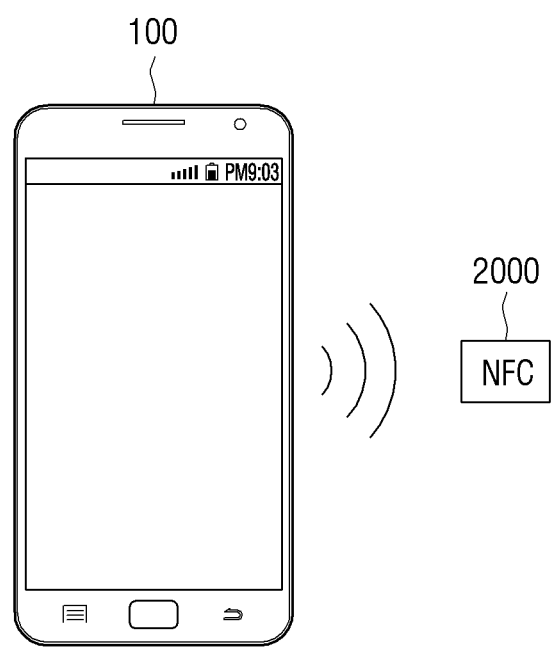

In addition, as illustrated in FIG. 12C, the controller 120 may transmit the initial setting information to another NFC tag. For example, the initial setting information stored in the NFC tag (or, NFC reader) provided on the display apparatus 100 may be transmitted to and stored in another NFC tag (or, NFC reader). In this case, the display apparatus 100 may be configured to include an NFC chip which operates according to a Near Field Communication (NFC) method using 13.56 MHz band from among various RF-ID frequency bands such as 135 kHz, 13.56 MHz, 433 MHz, 860~960 MHz, 2.45 GHz, etc.

Accordingly, the initial setting information which is set by a user may be shared with another user with a similar disability and thus, user convenience may be enhanced.

Meanwhile, the display apparatus 100 may provide a user with its own environment setting information through various methods. Hereinafter, a method for providing the environment setting information will be described in further detail with reference to FIGS. 13 to 18.

In response to an item for setting an environment of the display apparatus 100 being selected, the controller 120 may provide a plurality of menus which are classified according to an attribute of a setting function, and in response to a menu being selected from among the plurality of menus, may provide a plurality of menus which belong to the selected menu. In this case, the plurality of menus may be displayed through a UI screen configured by the output unit 110.

Herein, a menu and a sub-menu which belongs thereto may be menus which are related to each other in a manner of an upper-lower step in a tree structure. Hereinafter, the tree structure will be described with reference to FIG. 13.

In the tree structure, the menus are classified into upper menus and lower menus, and the upper menus and a plurality of sub-menus connected to the upper menus have different depths. In this case, the upper menu may have a common attribute of the plurality of sub-menus connected to the upper menu.

Figure 13:
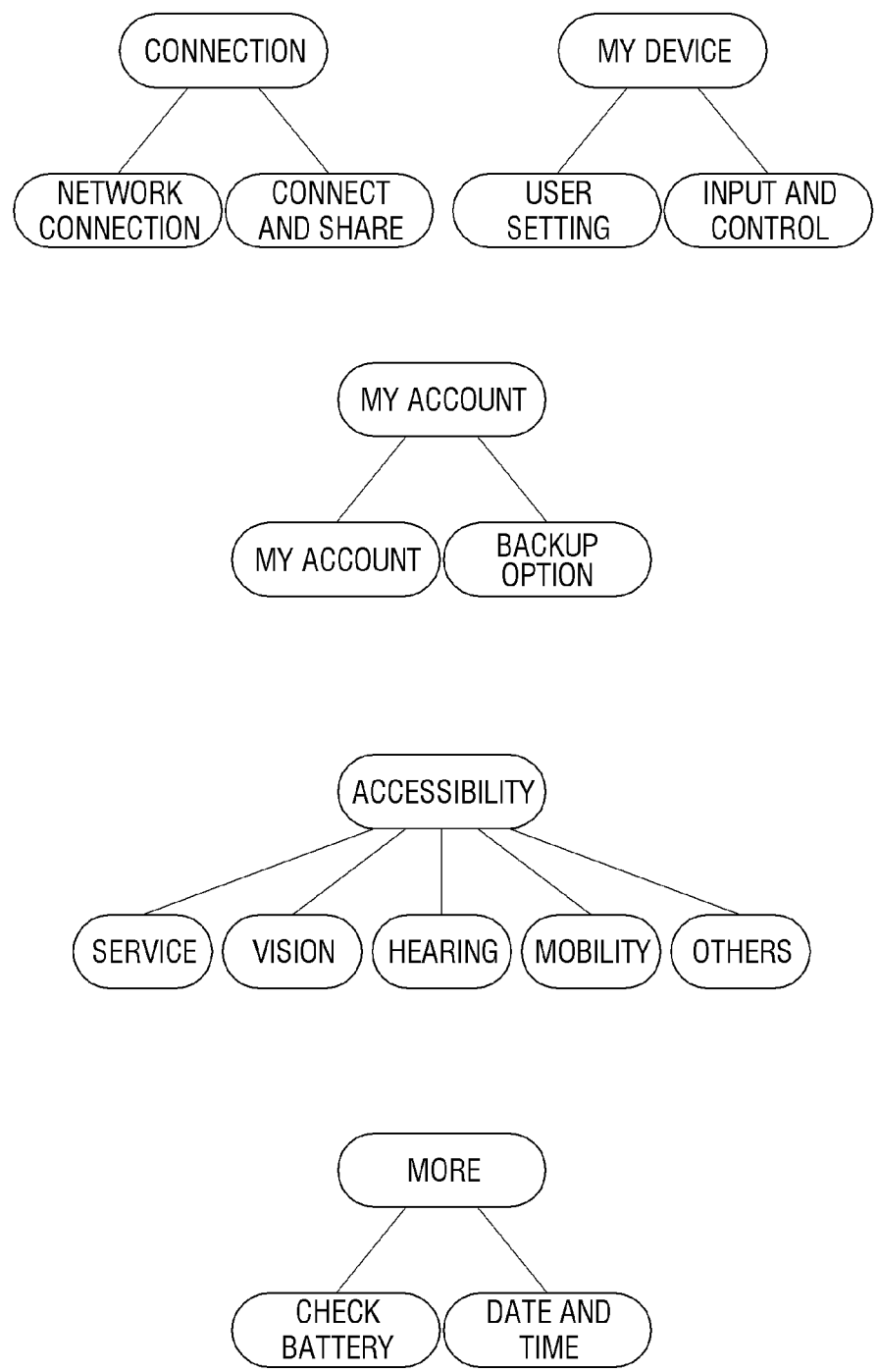
FIGS. 13 to 18C are views provided to describe a method for providing environment setting information according to an exemplary embodiment.

For example, as illustrated in FIG. 13, the display apparatus 100 may include uppermost menus such as "connection," "my device," "my account," "accessibility," and "more" in connection with the environment setting.

In this case, "connection" may include a sub-menu which needs to be set to connect the display apparatus 100 to a network by using a communication method such as Wi-Fi, Bluetooth, etc., like "network connection," and a sub-menu which needs to be set to connect the display apparatus 100 to other apparatus by using a communication method such as Near Field Communication (NFC), Wi-Fi direct, etc., like "connect and share."

"My device" may include a sub-menu which enables a user to set an audio-visual usage environment such as a display function, a sound function, and the like of the display apparatus 100, like "user setting," and a sub-menu which needs to be set for an input function and a control function of the display apparatus 100, such as a language function and a voice control function, like "input and control."

"My account" may include a sub-menu which needs to be set to log in an external server through the display apparatus 100, like "my account," and a sub-menu which is set to back data stored in the display apparatus 100 up in a cloud server, like "backup option."

"Accessibility" may include the sub-menus which are set in order to improve the accessibility of users who have impaired vision, hearing, or reduced dexterity with respect to the display apparatus 100.

To be specific, "accessibility" may include a sub-menu which is set to provide a talkback function, like "service," a sub-menu which is set to provide users who have a weak or impaired vision with a function such as a font size, enlarge, color reverse, like "vision," a sub-menu which is set to provide users who have a weak or impaired hearing with a function such as a sound balance, mono-audio, turn off all sounds, like "hearing," a sub-menu which is set to provide a function for users who have reduced dexterity, like "mobility," and a sub-menu which is set to improve the accessibility of the display apparatus 100 on top of the aforementioned menus, like "others."

"More" may include a sub-menu for checking a remaining battery capacity, like "battery," or for setting a date and time, like "date and time."

In such tree structure, in response to a particular menu being selected, the controller 120 may display a list including names of the menus which belong to a lower depth of the selected menu, and in response to a menu being selected from the list, may display only a menu which belongs to the selected menu.

Figure 14A:
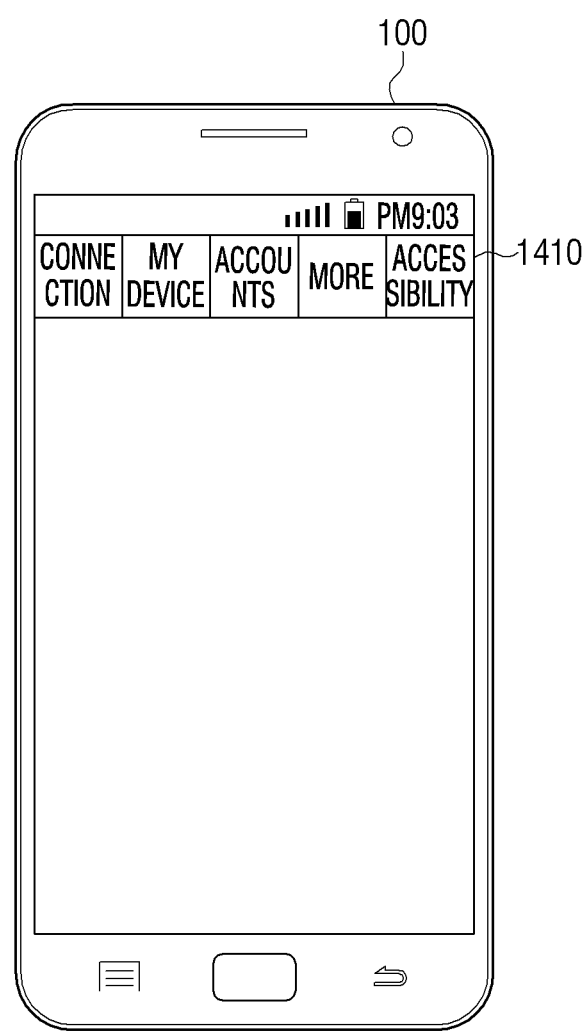

For example, in response to a menu having a tree structure as illustrated in FIG. 13, a first depth menu list 1410 including the menu items "connection," "my device," "my account," "accessibility," and "more" may be displayed, as illustrated in FIG. 14a. In this case, in response to a user command for executing an environment setting application installed in the display apparatus 100 (for example, a user command for selecting an environment setting icon displayed on a home screen) being received, the controller 120 may display the first depth menu list 1410 through the output unit 110.

Figure 14B:
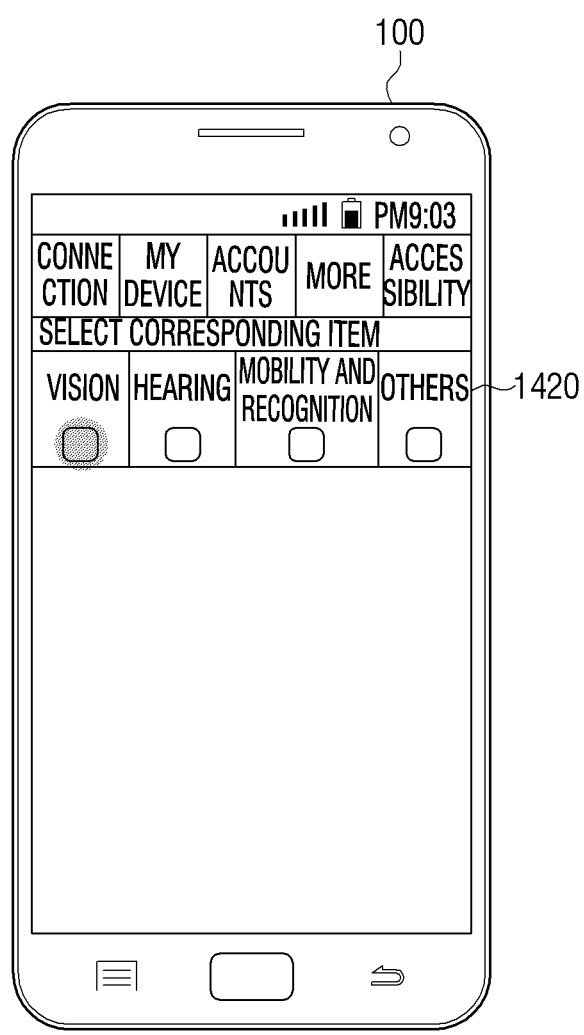

Subsequently, in response to the menu item "accessibility" being selected from the first depth menu list 1410, the controller 120 may display a second depth menu list including the sub-menus of the accessibility menu, that is, "service," "vision," "hearing," "mobility," and "others" as illustrated in FIG. 14b. In this case, the second depth menu list 1420 may be displayed on a lower section of the first depth menu list 1410.

Figure 14C:
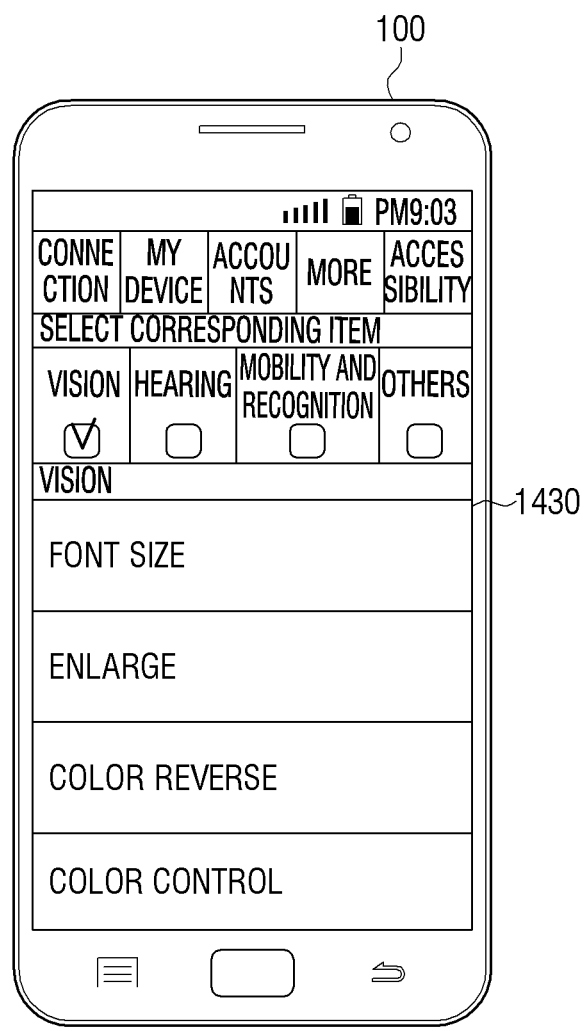

Subsequently, in response to the menu item "vision" being selected from the second depth menu list 1420, the controller 120 may display a third depth menu list 1430 including the sub-menus of the vision menu, that is, the menu items "font size," "enlarge," "color reverse," "color control," and the like, as illustrated in FIG. 14c.

In this case, in response to the menus belonging to the third depth menu list 1430 being the lowermost menus, the third depth menu list 1430 may be displayed vertically, and may be provided in a scrollable form according to the number of the menu items, as illustrated in FIG. 14c. That is, a user is able to be provided with a menu item which belongs to the third depth menu list 1430 but is not displayed on a screen by a scrolling operation.

Referring to those menu lists, in response to a menu having a certain depth being selected, the controller 120 displays a menu list including the names of the menus which belong to a lower depth of the selected menu and displays a menu which belongs to a lower depth of a menu selected from the menu list, rather than displaying all of the menus having a depth lower than a depth of the selected menu at a time.

In this case, in response to the lower depth of the selected menu belonging to the lowermost depth, the controller 120 may display a menu list related to the menus which belong to the depth, and display a UI screen for setting the menu selected from the menu list.

That is, as described above, in response to the menu "accessibility" being selected, the controller 120 does not display all menus having a depth lower than a depth of the menu "accessibility," and displays a menu list including the menus which belong to the lower depth of the menu "accessibility," that is, a menu list including "service," "vision," "hearing," "mobility," and "others," and in response to the menu "vision" being selected from the menu list, displays only a menu which belongs to the lower depth of the menu "vision."

In this case, in response to a menu being selected from among the menus which belong to the lower depth of "vision," the controller 120 may display a UI screen for setting the selected menu.

As described above, in response to a particular menu being selected, the controller provides only the menus which belong to a next depth of the selected menu sequentially, rather than providing all menus which belong to the lower depth of the selected menu at a time. In this regard, it is possible to resolve a problem that a user should consume much time in order to find a desired menu item.

Particularly, the present exemplary embodiment sequentially provides a menu which is set to provide a function which is useful to users who have reduced dexterity according to a depth from among the menus which may be provided by the display apparatus 100, that is, the menu "accessibility," and thus, the effectiveness may increase more.

Meanwhile, in the aforementioned example, although it was described that a sub-menu is displayed in response to a particular menu being selected, it is merely an example.

That is, in response to a menu of the same depth having a similar attribute existing, even though the menu belongs to different nodes from a menu selected from the tree structure, the controller 120 may display the menu with the sub-menu which belongs to the selected menu.

For example, it is assumed that the menu item "vision" is selected from the "accessibility." In this case, as described above, the menu item "vision" is a menu which is set to provide a function for users who have a weak or impaired vision, and thus, a function related to the vision may be set. Meanwhile, "use setting" of "my device" is a menu which enables a user to set a visual usage environment of the display apparatus 100, and thus, it may be understood that "accessibility" and "vision" have the common attribute, that is, "vision."

Accordingly, in response to the menu item "vision" being selected from the menu "accessibility," the controller 120 may display the sub-menu which belongs to "vision" and the sub-menu which belongs to "user setting" of "my device" at a time.

In addition, in the aforementioned example, although it was described that the menus which belong to the lowermost depth are displayed in a form of list, it is merely an example, and the menus which belong to the lowermost depth may be provided to a user through various methods.

For example, the controller 120 may display the menus which belong to the lowermost depth by using a wizard method. Herein, the wizard method refers to a method of sequentially displaying each UI screen for setting a menu which belongs to the lowermost depth.

Figure 15A:
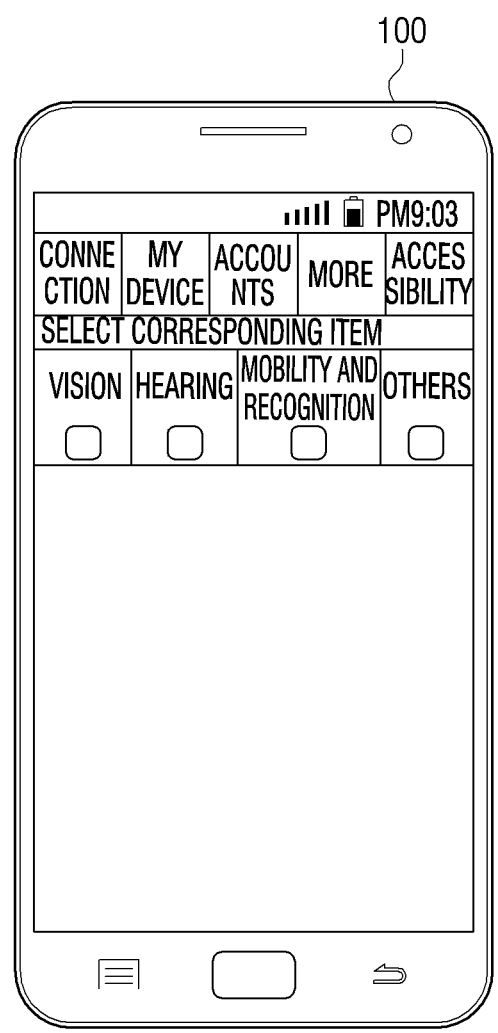

To be specific, it is assumed that the menu item "vision" is selected from the sub-menus of "accessibility" in a screen as illustrated in FIG. 15*a*. Herein, the vision menu may include the menu items "font size," "enlarge," "color reverse," and "color control," which have the lowermost depth.

Figure 15B:
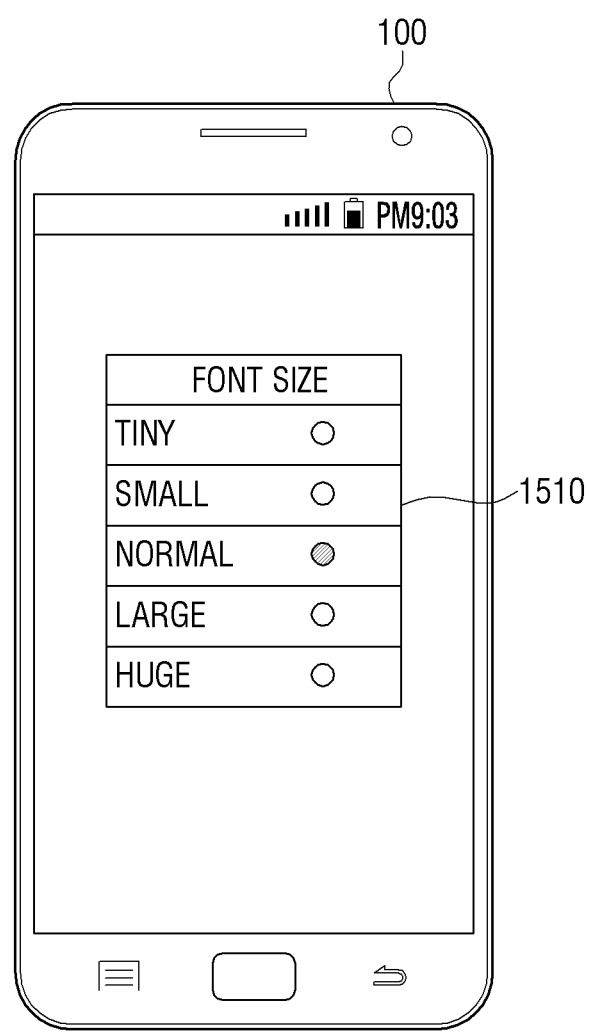

In this case, the controller 120 may display a UI screen 1510 for setting "font size" as illustrated in FIG. 15*b*. Accordingly, in response to the font size being set in the UI screen 1510, the controller 120 may apply the set font size to the display apparatus 100.

Subsequently, the controller 120 may display the UI screens for setting each of "enlarge," "color reverse," and "color control" sequentially, and thus, may receive a setting of a different menu within the vision menu.

Meanwhile, in the aforementioned example, although it was described that the user is provided with the accessibility menu sequentially by selecting the environment setting icon displayed on the home screen, it is merely an example.

Figure 16A:
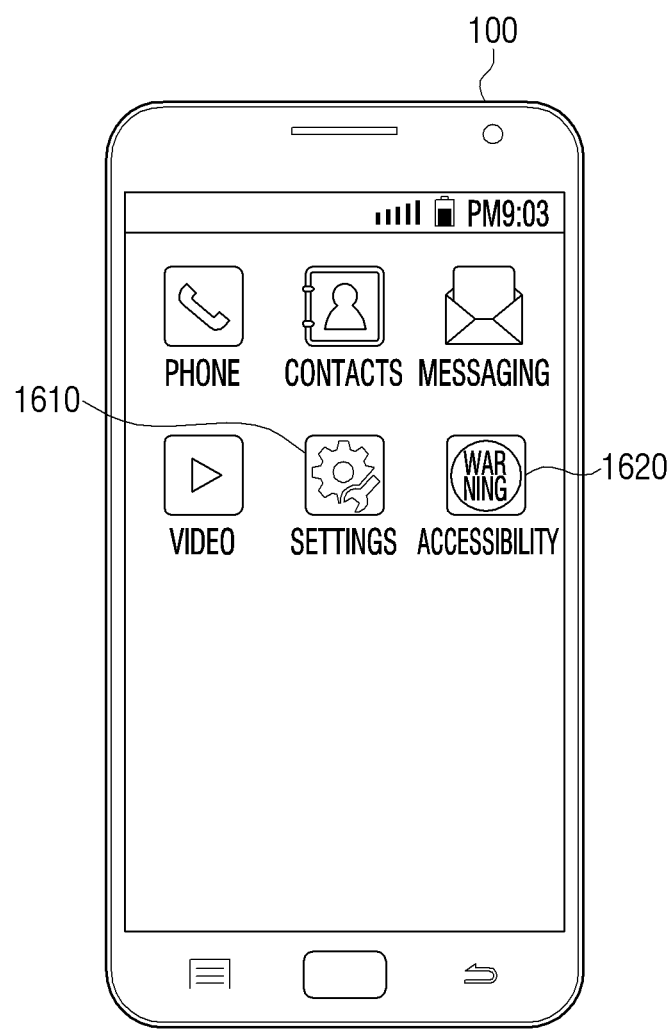
Figure 16B:
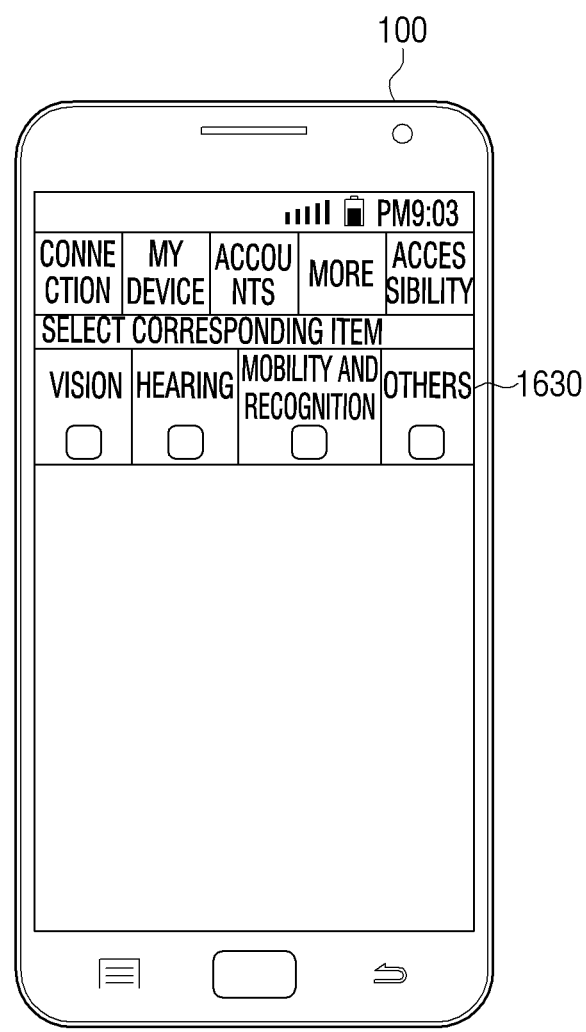

To be specific, as illustrated in FIG. 16*a*, the controller 120 may display a link for entering into the accessibility menu other than an environment setting icon 1610 on the home screen in a form of an item 1620. Accordingly, in response to the item 1620 being selected, the controller 120 may display a second depth menu list 1630 including the sub-menus of the accessibility menu, that is, "service," "vision," "hearing," "mobility," and "others" as illustrated in FIG. 16*b*.

Meanwhile, the controller 120 may apply a function set according to a user command on a menu item to the display apparatus 100. In this case, in response to a user command for displaying the set function being received, the controller 120 may display a list including only the menu items set by the user.

In this case, the user command for displaying the set functions may be inputted through various methods.

Figure 17A:
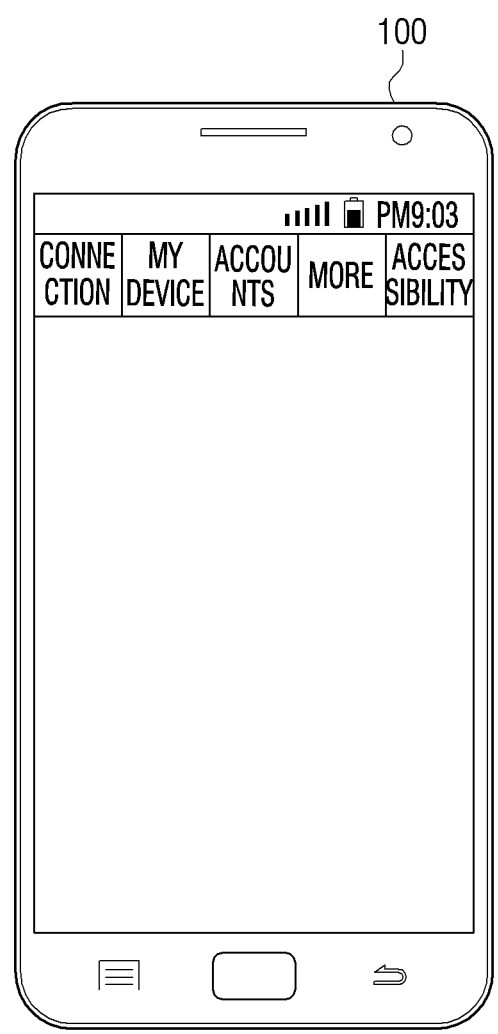
Figure 17B:
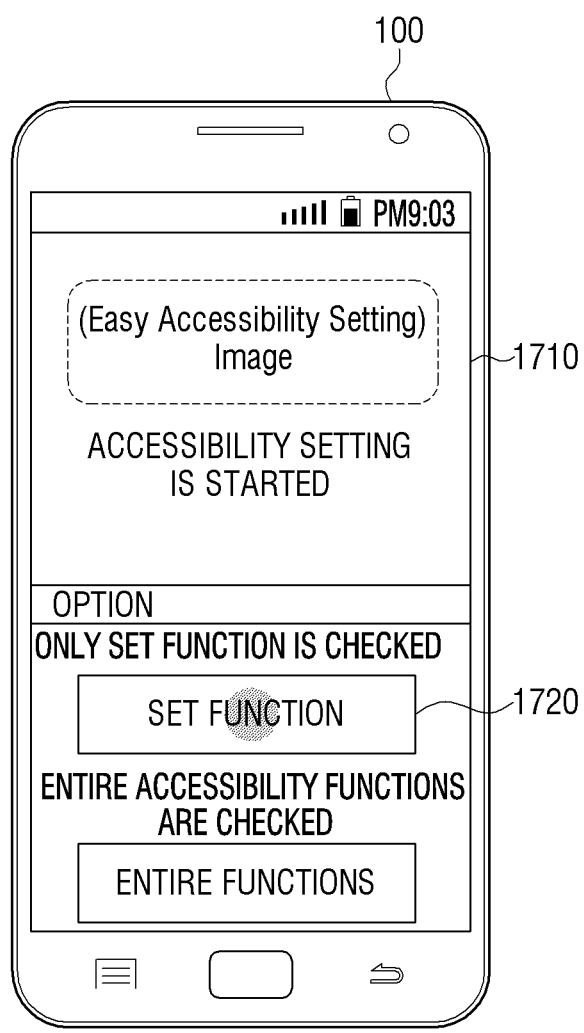

For example, in response to the accessibility menu being selected on a screen as illustrated in FIG. 17*a*, the controller 120 may display a UI screen 1710 as illustrated in FIG. 17*b*. In this case, the UI screen 1710 may include a menu item 1720 for receiving a user command for displaying only the menu item set by the user.

Figure 17C:
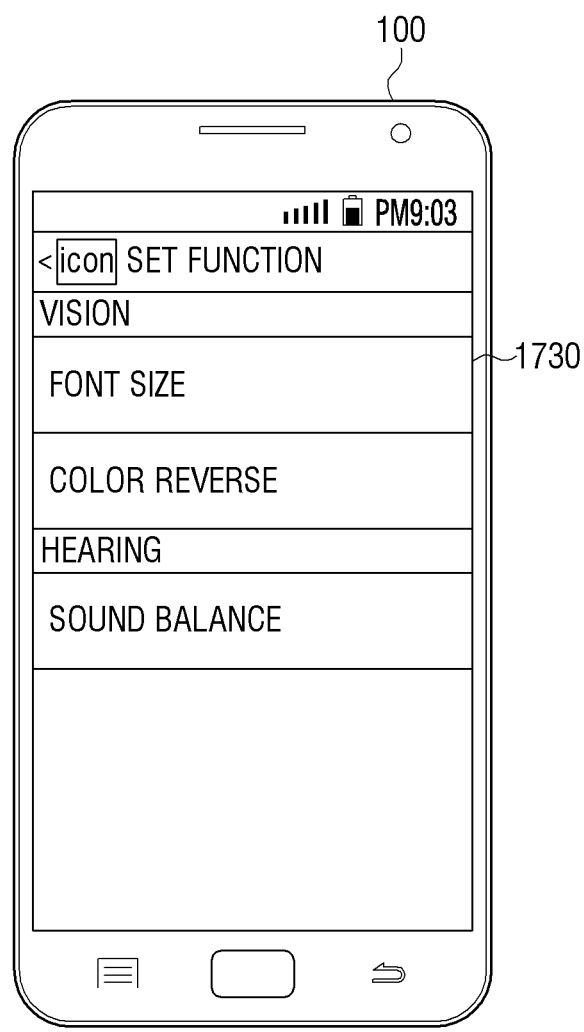

In response to the menu item 1720 being selected, as illustrated in FIG. 17*c*, the controller 120 may display a UI screen including a list including only the menu items whose settings are changed by the user based on the initial setting in a manufacturing process.

Figure 18A:
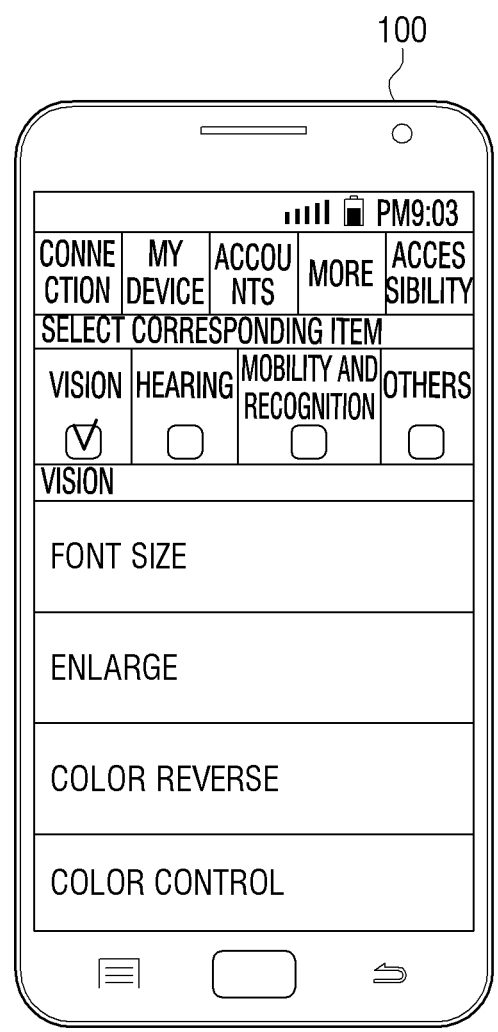
Figure 18B:
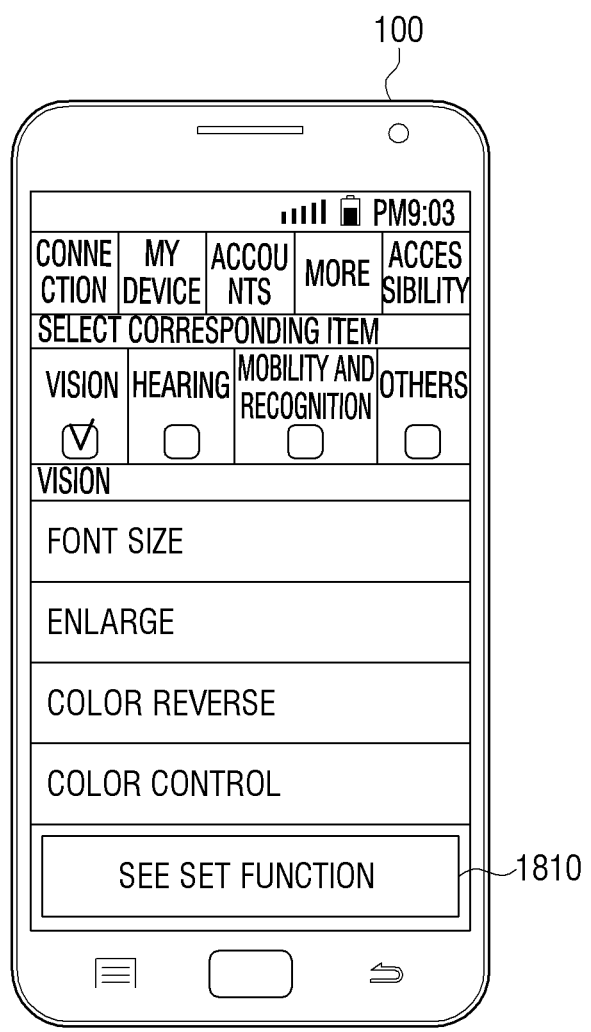

As another example, as illustrated in FIG. 18*a*, in response to a particular physical button provided on the display apparatus being selected while a screen is displayed, the controller 120 may display a menu item 1810 for receiving a user command for displaying only the menu item set by the user.

Figure 18C:
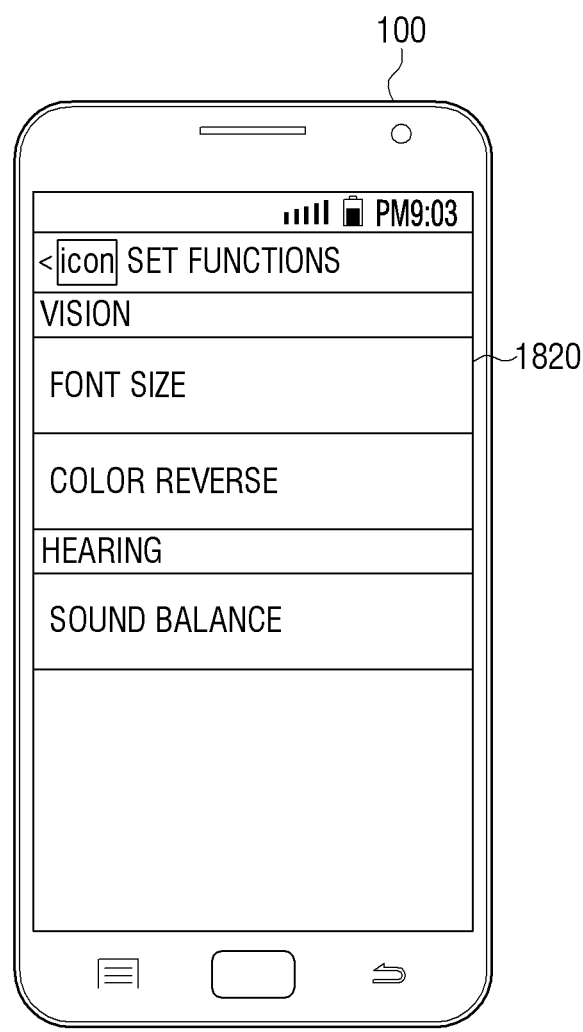

Accordingly, in response to the menu item 1810 being selected, the controller 120 may display a UI screen including a list 1820 which includes only the menu items whose settings are changed by the user based on the initial items in the manufacturing process, as illustrated in FIG. 18*c*.

Figure 19:
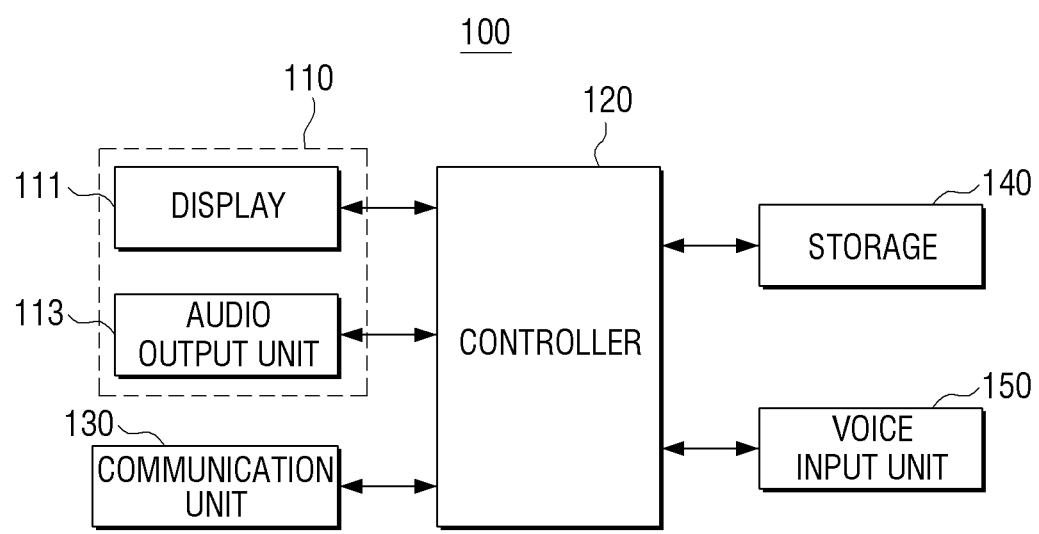
FIG. 19 is a block diagram provided to explain a specific configuration of a display apparatus according to an exemplary embodiment.

FIG. 19 is a block diagram provided to explain a detailed configuration of a display apparatus according to an exemplary embodiment. Referring to FIG. 19, the display apparatus 100 may further include a communicator 130, a storage 140, and a voice input unit 150 in addition to the output unit 110 and the controller 20. The elements may be controlled by the controller 120. Detailed description regarding the elements of FIG. 19 which overlap with the elements of FIG. 1 will not be provided.

The output unit 110 includes a display 111 and an audio output unit 113.

The display 111 may display various screens. Specifically, the display 111 may display a UI screen which is required for the initial setting.

In addition, the display 111 may be configured in the form of a touch screen including a touch sensor so as to receive a touch manipulation and to transmit the received touch manipulation to the controller 120.

Accordingly, the controller 120 may perform various operations according to a touch manipulation. For example, in response to a touch mode being set as an input mode, the controller 120 may determine a setting item selected on the UI screen according to a touch manipulation and set a setting value for the display apparatus 100 based on the determined setting item. In addition, in response to a drawing mode being set as an input mode, the controller 120 may determine a drawing input on the UI screen and set a setting value for the display apparatus 100 based on the determined drawing.

The audio output unit 113 may output various types of audio. Specifically, the audio output unit 113 may be implemented as a speaker, an audio output port, etc., and may output various audio regarding the initial setting.

The communicator 130 performs communication with an external apparatus (not shown). Herein, the external apparatus (not shown) may include at least one of another display apparatus, an external server, and a near-field wireless communication tag.

Specifically, the communicator may perform communication using various communication methods such as wired/wireless Local Area Network (LAN), NFC, WiFi, WAN, Ethernet, Bluetooth®, Zigbee®, Universal Serial Bus (USB), IEEE®1394, 3G, 4G, etc.

To do so, the communicator 130 may include various communication modules to perform network communication according to each communication method. For example, when communication is performed according to a WiFi method, the communicator 130 may include a WiFi communication chip (not shown). In addition, the communicator 130 may include at least one of a tag and a reader for NFC communication.

The storage 140 stores various data and an operating system (OS) to drive and control the display apparatus 100. To do so, the storage 140 may be implemented as a storage medium such as a non-volatile memory (for example, flash memory and Electrically Erasable ROM (EEROM)), a hard disk, etc.

The voice input unit 150 may receive a user voice. Specifically, the voice input unit 150 may be implemented as a microphone to receive a user voice, and may transmit the input user voice to the controller 120. Accordingly, the controller 120 may recognize voice recognition with respect to the user voice transmitted from the voice input unit 150 using a voice recognition module (not shown) and may perform an initial setting operation of the display apparatus 100.

Figure 20:
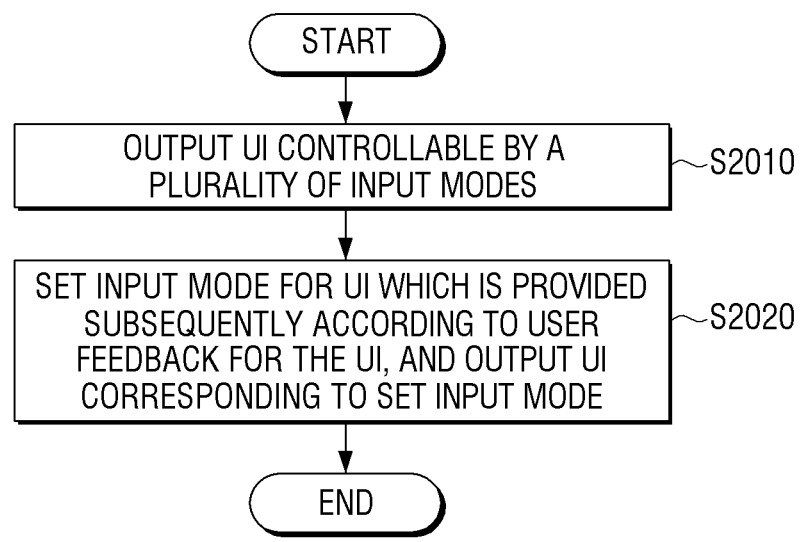
FIG. 20 is a flowchart provided to explain a method of controlling a display apparatus according to an exemplary embodiment.

FIG. 20 is a flowchart provided to explain a method of controlling a display apparatus, according to an exemplary embodiment.

A UI which is controllable by a plurality of input modes is output (S2010). Herein, the UI controllable by a plurality of input modes includes a graphic UI and a voice UI for initial setting of a display apparatus.

Subsequently, an input mode for the subsequent UI is determined according to a user feedback type regarding the UI, and a UI which corresponds to the determined input mode is output (S2020).

In this case, in response to a touch manipulation regarding the graphic UI being input, a touch mode may be set as in input mode for the initial setting, and a user voice regarding the voice UI is input, a voice mode may be set as an input mode for the initial setting.

In response to a touch mode or a voice mode being set as an input mode based on a user feedback, a UI for resetting the set input mode as one of a touch mode, a drawing mode, and a voice mode is output, and the initial setting of the display apparatus may be performed based on the input mode which is reset through the UI.

In this case, in response to a touch mode being reset as an input mode, the initial setting of the display apparatus may be performed by recognizing a touch input regarding a setting item displayed on the screen. In response to a drawing mode being reset as an input mode, a drawing trace which is input on the screen may be recognized and the initial setting of the display apparatus may be performed according to a setting item which corresponds to the recognized drawing trace. Further, in response to a voice mode being reset as an input mode, the initial setting of the display apparatus may be performed according to a setting item which corresponds to the input user voice.

In addition, in response to the initial setting of the display apparatus being completed, the completed initial setting information may be transmitted to an external apparatus. In this case, the external apparatus may include at least one of another display apparatus, an external server and a near-field wireless communication tag.

A non-transitory computer readable storage medium where a program for performing the controlling method according to an exemplary embodiment sequentially is stored may be provided.

Herein, the non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as CD, DVD, hard disk, Blu-ray disk, USB, memory card, and ROM and provided therein.

In addition, although a bus is not shown in the above block diagrams illustrating a display apparatus and a server, each component of the display apparatus and the server may be connected through a bus. In addition, each device may further include processors such as CPU, microprocessor, etc. which performs various operations.

As described above, according to various exemplary embodiments, an input mode may be set based on a user feedback regarding a UI which is controllable by a plurality of input modes, and initial setting may be performed based on the set input mode. Accordingly, even a user who is not accustomed to using a display apparatus or a user with physical disability may perform initial settings according to an input mode which is suitable for the user and thus, user convenience may be enhanced.

The foregoing exemplary embodiments and advantages are merely exemplary and are not to be construed as limiting. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a display;
a microphone;
an audio output unit; and
at least one processor configured to:
control the display to display a user interface (UI) for an initial setting of the display apparatus and control the audio output unit to output an audio for the initial setting of the display apparatus,
receive one of a touch input through the display and a voice input through the microphone,
set an input mode based on whether the touch input is received or the voice input is received, and
control the display to display one of different UIs based on the set input mode,
wherein the processor is further configured to inactivate the microphone if the input mode is set, based on the touch input being received while the UI is displayed, to a touch mode in which user commands are received through a touch screen of the display, and
wherein the processor is further configured to inactivate a touch sensor of the touch screen if the input mode is set, based on the voice input being received while the UI is displayed, to a voice mode in which user commands are received through the microphone.

2. The display apparatus as claimed in claim 1, wherein the processor is configured to control the display to display a UI to reset the set input mode as one of the touch mode, a drawing mode, and the voice mode, and perform the initial setting of the display apparatus based on an input mode which is reset through the UI to reset the set input mode based on the touch mode or the voice mode being input as the input mode based on a user input received via the UI to reset the set input mode.

3. The display apparatus as claimed in claim 2, wherein the processor is configured to recognize a touch input regarding a setting item displayed on a screen and performs the initial setting of the display apparatus based on the touch mode being reset as the input mode.

4. The display apparatus as claimed in claim 2, wherein the processor is configured to recognize a drawing trace input on a screen and performs the initial setting of the display apparatus according to a setting item which corresponds to the recognized drawing trace based on the drawing mode being reset as the input mode.

5. The display apparatus as claimed in claim 2, wherein the processor is configured to perform the initial setting for the display apparatus according to a setting item which corresponds to a user voice which is input based on the voice mode being reset as the input mode.

6. The display apparatus as claimed in claim 2, further comprising:
a communicator configured to communicate with an external apparatus,
wherein the processor is configured to transmit, to the external apparatus, information regarding a completed initial setting based on the initial setting of the display apparatus being completed.

7. The display apparatus as claimed in claim 6, wherein the external apparatus includes at least one of another display apparatus, an external server and a near-field wireless communication tag.

8. The display apparatus as claimed in claim 1, wherein based on an item for setting an environment of the display apparatus being selected, the processor provides a plurality of menus classified according to an attribute of a setting function, and based on a menu being selected from among the plurality of menus, provides a sub-menu which belongs to the selected menu.

9. The display apparatus of claim 1, wherein the audio output unit comprises a speaker.

10. A method of controlling a display apparatus, the method comprising:
displaying a user interface (UI) for an initial setting of the display apparatus and outputting an audio for the initial setting of the display apparatus;
receiving one of a touch input through a display of the display apparatus and a voice input through a microphone of the display apparatus;
setting an input mode based on whether the touch input is received or the voice input is received; and
displaying one of different UIs based on the set input mode,
wherein the setting the input mode comprises:
inactivating the microphone if the input mode is set, based on the touch input being received while the UI is displayed, to a touch mode in which user commands are received through a touch screen of the display apparatus; and
inactivating a touch sensor of the touch screen if the input mode is set, based on the voice input being received while the UI is displayed, to a voice mode in which user commands are received through the microphone.

11. The method as claimed in claim 10, further comprising:
displaying a UI to reset the set input mode as one of the touch mode, a drawing mode, and the voice mode, and performing the initial setting of the display apparatus based on an input mode which is reset through the UI to reset the set input mode.

12. The method as claimed in claim 11, wherein the performing the initial setting comprises recognizing a touch input regarding a setting item displayed on a screen and performing the initial setting of the display apparatus, based on the touch mode being reset as the input mode.

13. The method as claimed in claim 11, wherein the performing the initial setting comprises recognizing a drawing trace input on a screen and performing the initial setting for the display apparatus according to a setting item which corresponds to the recognized drawing trace, based on the drawing mode being reset as the input mode.

14. The method as claimed in claim 11, wherein the performing the initial setting comprises performing the initial setting for the display apparatus according to a setting item which corresponds to a user voice which being input, based on the voice mode being reset as the input mode.

15. The method as claimed in claim 11, further comprising:
transmitting information regarding a completed initial setting to an external apparatus based on the initial setting of the display apparatus being completed.

16. The method as claimed in claim 15, wherein the external apparatus includes at least one of another display apparatus, an external server and a near-field wireless communication tag.

17. The method as claimed in claim 10 further comprising:
providing a plurality of category menus classified according to an attribute of a setting function based on an item being selected, the item being for setting an environment of the display apparatus; and based on a category menu being selected from the plurality of category menus, providing a sub-menu which belongs to the selected category menu.

* * * * *